(12) United States Patent
Kumagai et al.

(10) Patent No.: US 10,264,221 B2
(45) Date of Patent: Apr. 16, 2019

(54) MEASUREMENT SYSTEM, MEASUREMENT METHOD, SURVEY MACHINE, AND REFLECTION TARGET FOR MEASUREMENT

(71) Applicant: Kabushiki Kaisha TOPCON, Tokyo (JP)

(72) Inventors: Kaoru Kumagai, Tokyo (JP); Nobuyuki Nishita, Tokyo (JP); Jumpei Kochi, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 212 days.

(21) Appl. No.: 15/004,083

(22) Filed: Jan. 22, 2016

(65) Prior Publication Data

US 2016/0216109 A1 Jul. 28, 2016

(30) Foreign Application Priority Data

Jan. 27, 2015 (JP) .................................. 2015-013627

(51) Int. Cl.
| | |
|---|---|
| *H04N 7/18* | (2006.01) |
| *G01C 15/00* | (2006.01) |
| *G01S 17/66* | (2006.01) |
| *G01S 7/481* | (2006.01) |

(52) U.S. Cl.
CPC ........... *H04N 7/181* (2013.01); *G01C 15/002* (2013.01); *G01S 7/481* (2013.01); *G01S 17/66* (2013.01)

(58) Field of Classification Search
CPC ......... H04N 7/181; G01S 7/481; G01S 17/66; G01C 15/002

USPC ......................................................... 348/135
See application file for complete search history.

(56) References Cited

U.S. PATENT DOCUMENTS

| | | | |
|---|---|---|---|
| 2005/0168578 A1* | 8/2005 | Gobush .............. | A63B 24/0021 348/207.99 |
| 2008/0004808 A1* | 1/2008 | Johnson ............... | G01C 15/002 702/1 |
| 2010/0245587 A1* | 9/2010 | Otani ................... | G01C 15/002 348/169 |
| 2015/0096260 A1* | 4/2015 | Intagliata .............. | E04H 12/347 52/741.14 |
| 2015/0119685 A1* | 4/2015 | Daon .................... | A61B 19/54 600/407 |

FOREIGN PATENT DOCUMENTS

| | | |
|---|---|---|
| JP | 11-351870 A | 12/1999 |
| JP | 2009-250836 A | 10/2009 |
| JP | 2010-237169 A | 10/2010 |
| JP | 2014-085134 A | 5/2015 |

* cited by examiner

*Primary Examiner* — Allen C Wong
(74) *Attorney, Agent, or Firm* — Roberts Mlotkowski Safran Cole & Calderon, P.C.

(57) ABSTRACT

To provide a measurement system in which a desired reflection target is properly identified. The system 1 includes a prism 4, and a total station 3 which, for conducting distance measurement based on reflected distance-measuring rays which are output to the prism 4 and reflected therefrom. The prism 4 is equipped with specific identification information such that the total station 3 sets up the identification information 6, and incorporates the specific identification information 6 of the prism 4 for checking the above specific identification information 6 and the setup identification information 6.

10 Claims, 21 Drawing Sheets

Fig. 2 ( a )
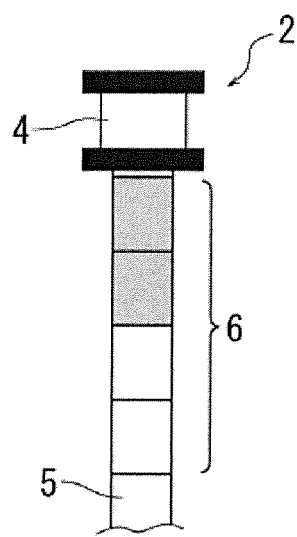
Fig. 2 ( b )
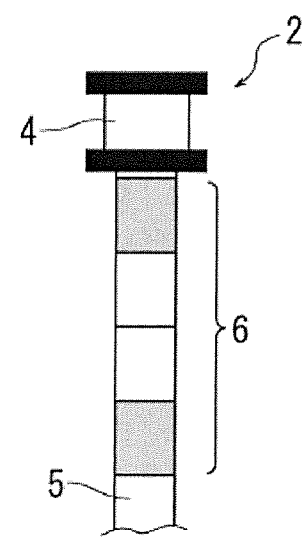

MEASUREMENT SYSTEM, MEASUREMENT METHOD, SURVEY MACHINE, AND REFLECTION TARGET FOR MEASUREMENT

TECHNICAL FIELD

The present invention relates to a measurement system, a measurement method, a survey machine and a reflection target for measurement.

BACKGROUND ART

A reflection target-holding device which holds a reflection target (prism, for example) on a supporting member (pole, for example), and a survey machine for measuring a distance based on distance-measurement rays which are input to and reflected from the reflection target are used for measurement. In the measurement using these, the survey machine measures a vertical angle, a horizontal angle and a distance-measurement value on the center of the reflection target, and the survey machine further calculates, by using these measurement values, the information about a position identified by the reflection target-holding device (a point where the supporting member is in contact).

As described in Patent Publication 1 (FIG. 3), a survey machine has been widely used that includes functions of automatically collimating the reflection target of the reflection target-holding device, and of chasing the reflection target of the reflection target-holding device. When these functions are achieved and a plurality of the reflection targets are detected in an angular field of the survey machine's telescope, the reflection target nearest to the telescope center is locked (automatically collimated). When no reflection target exists in the angular field of the telescope, the vertical angle and the horizontal angle are adjusted to search the circumference for locking the reflection target which is located first.

These functions are focused, and the reflection target-holding device is mounted on a ground-leveling vehicle (grader, for example) on a working site where the leveling of the working surface such as a road surface is performed. By means of the full-time observation of the measurement values of the reflection target based on the functions of the automatic collimation and the automatic chasing, the leveling situation of the working surface is comprehended for intending the optimization of the working (planarization of road surface).

In the measurement work by a measurement worker, while the worker moves the reflection target-holding devices to many measurement points, the reflection target of the reflection target-holding device is automatically chased to the survey machine so that the information of the respective measurement points is obtained. Based on the information, the leveling situation of the working surface is comprehended.

PRIOR TECHNICAL PUBLICATIONS

Patent Publications

Patent Publication 1: JP-A-2009-250836

SUMMARY OF INVENTION

Problems to be Solved by Invention

However, in the working site, the working is conducted by using many ground-leveling vehicles, and the reflection target-holding devices are mounted to each of many ground-leveling vehicles. Accordingly, when the automatic collimation and the automatic chasing are performed on the working site where the plurality of the reflection targets exist, the survey machine does not always lock the desired reflection target.

Also, in the working site, the measurement working is conducted by many workers having the reflection target-holding devices so that, similarly to the above, the survey machine does not always lock the desired reflection target. Accordingly, the situation of the working surface cannot be possibly comprehended in an appropriate manner.

The present invention has been made to overcome these disadvantages, and a first object thereof is to provide a measurement system which properly identifies the desired reflection target.

A second object thereof is to provide a measurement method which properly identifies the desired reflection target.

A third object thereof is to provide a survey machine which properly identifies the desired reflection target.

A fourth object thereof is to provide a reflection target for measurement which properly identifies that the target itself is the desired reflection target or not.

Means of Solving Problems

The present invention (Claim 1) for achieving the first object has the configuration of a reflection target including specific identification information; and a survey machine, for conducting distance measurement based on reflected distance-measuring rays which are output to the reflection target and reflected from the reflection target, including an operation inputting unit for setting up the identification information, a first searching unit for searching the reflection target, a second searching unit for searching the specific identification information possessed by the reflection target near the reflection target when the first searching unit detects the reflection target, an identification information detecting unit for detecting the specific identification information of the reflection target from the searched information of the second searching unit, and a checking unit of checking the identification information detected by the identification information detecting unit with setup identification information set up by the operation inputting unit. Claim 2 is a preferred embodiment of Claim 1.

The present invention (Claim 3) for achieving the second object has the configuration of a measurement method in which a distance is measured based on reflected distance-measuring rays which are output to a reflection target and reflected from the reflection target, the method including:

using the reflection target including specific identification information;

performing a first searching for searching the reflection target before the distance measurement, performing a second searching for searching the specific identification information of the reflection target near the reflection target when the reflection target is detected in the first searching;

detecting the specific identification information of the reflection target from the searched information of the second searching; and checking the specific identification information of the reaction target with specific identification information of a desired reaction target.

Claims 4 and 5 are preferred embodiments of Claim 3.

The present invention (Claim 6) for achieving the third object has the configuration of a survey machine for conducting distance measurement based on reflected distance-measuring rays which are output to a reflection target storing specific identification information and reflected from the reflection target, the survey machine including:

an operation inputting unit for setting up the identification information;

a first searching unit for searching the reflection target;

a second searching unit for searching the specific identification information possessed by the reflection target near the reflection target when the first searching unit detects the reflection target;

an identification information detecting unit for detecting the specific identification information of the reflection target from the searched information of the second searching unit; and a checking unit of checking the identification information detected by the identification information detecting unit with setup identification information set up by the operation inputting unit.

Claims 7 and 8 are preferred embodiments of Claim 6.

The present invention (Claim 9) for achieving the fourth object has the configuration of a reflection target for measurement which reflects distance-measuring rays which are output for measuring a distance, the reflection target comprises specific identification information.

Claim 10 is a preferred embodiment of Claim 9.

Effects of Invention

In accordance with the present invention (Claim 1), while the specified identification information possessed by the desired reflection target is set up as the setup identification information in the survey machine, the specific identification information and the setup identification information can be checked with each other, after the incorporation of the specific identification information of the reflection target, for checking whether or not the checked reflection target is the desired reflection target. Accordingly, the desired reflection target can be simply and properly identified.

The survey machine includes the first searching unit for searching the reflection target, the second searching unit for searching the specific identification information possessed by the reflection target near the reflection target when the reflection target is detected by the first searching unit, and the identification information detecting unit for detecting the specific identification information of the reflection target from the searching information of the second searching unit. Accordingly, the subject to be detected (reflection target, identification information) can be narrowed down in a stepwise fashion by selecting the searching unit and the detecting unit suitable for the detection of the subject in consideration that the reflection target is searched with relative ease and the specific identification information exists near the reflection target. Therefore, the specific identification information of the reflection target can be effectively detected for prompting the detection. Because of this, the judgment whether or not the checked reflection target is the desired reflection target can be performed without delay.

In accordance with the embodiment of Claim 2, after obtaining image information, the first searching unit is set up to estimate the existence estimation region where the reflection target exists based on the image information, and to detect the reflection target in the existence estimation region, so that the existence estimation region of the reflection target can be located at a stroke for directly accessing to the existence estimation region and for effectively detecting the reflection target. This enables the prompt detection of the specific identification information of the reflection target followed by the prompt checking between the specific identification information and the setup identification information of the desired reflection target.

On the other hand, when the checking unit judges that the identification information detected by the identification information detecting unit is not coincide with the setup identification information, the first searching unit searches a new reflection target so that the existence estimation region of each refection target is directly accessed for detecting the refection target and the specific identification information until the desired reflection target is located. Accordingly, the specific identification information of each reflection target can be serially checked with respect to the setup information.

Therefore, even when a plurality of the reflection targets are present, the desired reflection target can be promptly identified.

In accordance with the embodiment of Claim 3, the specific identification information of the reflection target is checked with the specific identification information of the desired reflection target for the distance measurement by using the reflection target having the specific identification information so that it can be judged whether or not the checked reflection target is the desired reflection target by setting up the specified identification information possessed by the desired reflection target as the setup identification information. Accordingly, similarly to the effects of the above Claim 1, the desired reflection target can be simply and properly identified by using the above method.

Before the checking between the specific identification information of the reflection target and the specific identification information of the desired reflection target, the first searching for searching the reflection target is at first performed, then the second searching for searching the specific identification information of the reflection target near the reflection target is performed when the reflection target is detected in the first searching, and the specific identification information of the reflection target is detected from the searched information of the second searching. Accordingly, similarly to the effects of the above Claim 1, the prompt detection of the specific identification information of the reaction target can be effectively performed by using the above method.

In accordance with the embodiment of Claim 4, after obtaining image information, the first searching is set up to estimate the existence estimation region where the reflection target exists based on the image information, and to detect the reflection target in the existence estimation region, and when the result of the checking is that the specific identification information of the reflection target is not coincide with the identification information of the desired reflection target, the new reflection target is searched under the first searching. Accordingly, the effects similar to those of the above Claim 2 can be obtained.

In accordance with the embodiment of Claim 5, the second searching is set up to measure the distance to the reflection target detected by the first searching for obtaining the image information based on the measured distance value so that the appropriate image for promptly detecting the specific identification information of the reflection target can be obtained.

In accordance with the invention of Claim 6, the survey machine includes the operation inputting unit for setting up the identification information, the first searching unit for searching the reflection target, the second searching unit for searching the specific identification information possessed by the reflection target near the reflection target when the first searching unit detects the reflection target, the identification information detecting unit for detecting the specific identification information of the reflection target from the searched information of the second searching unit, and the checking unit of checking the identification information detected by the identification information detecting unit with setup identification information set up by the operation inputting unit. Accordingly, similar to the effects of the above Claim 1, the desired reflection target can be simply and properly identified and it can be promptly judged whether or not the checked reflection target is the desired reflection target by using the above survey machine.

In accordance with the embodiment of Claim 7, the first searching unit includes the camera element for obtaining image information, the unit of judging the estimation region of existence of reflection target, the reflection target detecting unit which detects the reflection target in the estimation region of the existence of the reflection target judged by the unit of judging the estimation region, and when the checking unit judges that the identification information detected by the identification information detecting unit is not coincide with the setup identification information, the new reflection target is searched. Accordingly, the effects similar to those of the above Claims 2 and 4 can be obtained by using the above survey machine.

In accordance with the embodiment of Claim 8, the second searching unit includes a plurality of the camera-under-use elements having the different wide angles of field, the distance-measuring unit of the reflection target detected by the first searching unit, and the camera-under-use element judging unit for selecting the camera-under-use elements based on the information from the distance-measuring unit. Accordingly, the effects similar to those of the above Claim 5 can be obtained by using the above survey machine.

In accordance with the invention of Claim 9, the reflection target for measurement which reflects distance-measuring rays which are output for measuring a distance includes the specific identification information. Accordingly, by using the reflection target for measurement, its identification information and the specific identification information possessed by the desired reflection target can be checked with each other for judging whether or not the checked reflection target is the desired reflection target. Therefore, whether or not the reflection target for measurement is the desired the reflection target can be simply and properly identified.

In accordance with the embodiment of Claim 10, the specific identification information is formed as the pattern having the contrast difference so that a plurality of identification information can be identified from each other by differentiating the respective contrast difference patterns.

BRIEF DESCRIPTION OF DRAWINGS

FIG. 2a and FIG. 2b Illustrations explaining the prism-holding device of the first embodiment. Specifically, identification information of a prism-holding device of FIG. 2(a) is different from that of FIG. 2(b).

EMBODIMENTS FOR IMPLEMENTING INVENTION

Embodiments in accordance with the present invention will be described referring to the annexed drawings.

Figure 1:
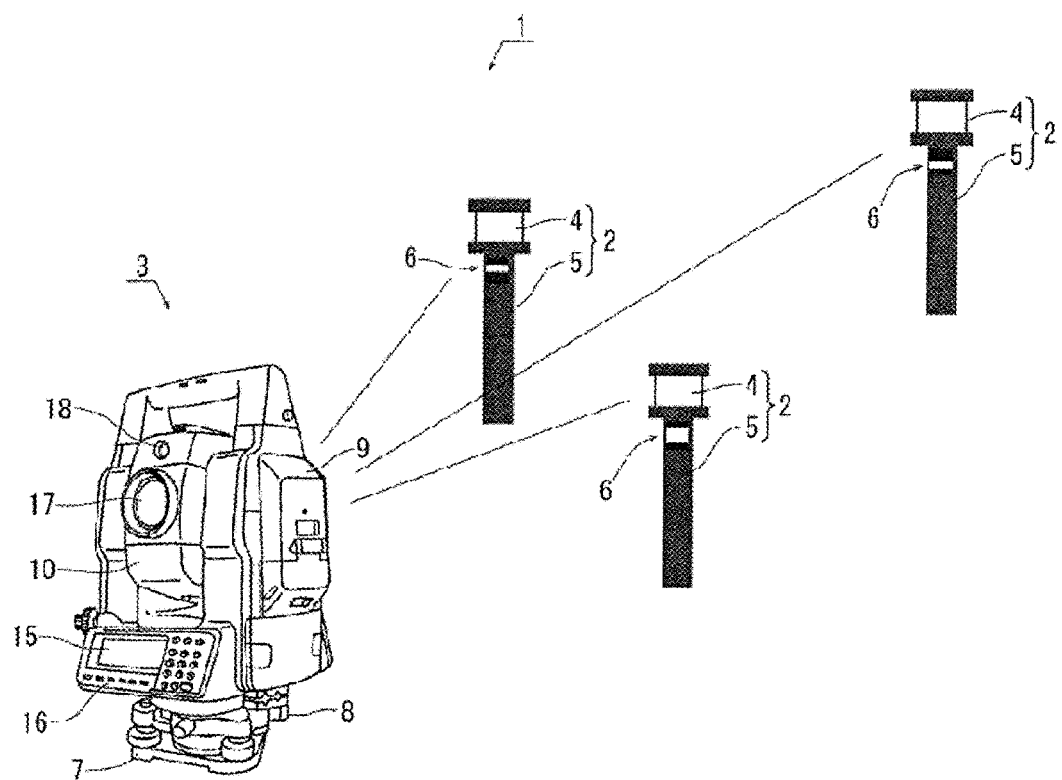
FIG. 1 An illustration explaining relation between a total station and a prism-holding device in accordance with a first embodiment.

1. In FIG. 1, a numeral 1 denotes a measurement system. The measurement system 1 includes a prism-holding device 2 acting as a device of holding a reflection target, and a total station 3 acting as a survey machine (electronic distance and angle measuring meter) 3.

2. As shown in FIGS. 1 and 2, the prism-holding device 2 includes a prism 4 acting as a reflection target, and a pole 5 acting as a supporting member of the prism 4.

(1) The prism 4 has a role of reflecting output rays from the total station 3 toward the total station 3. In the present embodiment, the prism 4 is used that reflects input rays from its whole circumference (360°) to the direction reverse to the input direction (so-called 360° type).

(2) The pole 5 extends having a constant length. The prism 4 is equipped to one end of the pole 5, and the other end of the pole 5 is attached to a construction vehicle (a ground-leveling vehicle such as a grader) or is contacted, as a ferrule, to an executed surface during the use of the prism-holding device 2.

(3) As shown in FIG. 2, identification information 6 specific to each of the prism-holding devices 2 is added to an external circumference of the one end of the pole 5. In the present embodiment, a black and white stripe pattern having large contrast difference is used as the identification information 6. The black and white colored regions each of which has a certain width are continuously arranged in the axial direction of the pole 5 on the whole circumference of the pole 5. For this reason, the identification information is visually recognized as the same black and white stripe patterns when viewed from any direction all around the whole circumference corresponding to the 360° type prism 4.

(4) The black and white stripe patterns acting as the identification information 6 are configured specific to each of the prism-holding devices 2, and are different from one other among the prism-holding devices 2. For example, the black and white stripe patterns of the prism-holding device 2 shown in FIG. 2(*a*) are zonal patterns in the order of "black-black-white-white" from one end (where the prism 4 is arranged) of the pole 5 to the other end, and those shown in FIG. 2(*b*) are zonal patterns in the order of "black-white-white-black" from one end of the pole 5 to the other end. In this manner, each of the respective prism-holding devices 2 can be identified by specifying the identification information 6.

Figure 3:
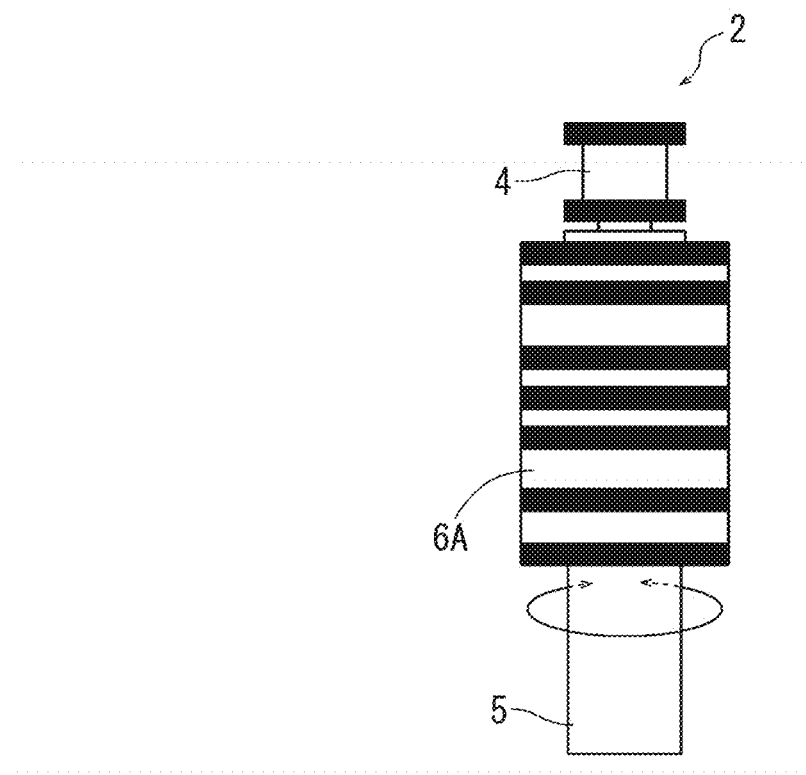
FIG. 3 An illustration of a state where a sheet-shaped identifier having identification information equipped to the prism-holding device of the first embodiment.

(5) The identification information 6 can be obtained by preparing the colored zonal materials for each of the black and white sections and by winding it around the external circumference of the pole 5, or, as shown in FIG. 3, by forming identification information 6A added with the black and white zonal patterns on one sheet and by winding it around the external circumference of the pole 5 while the width direction of the respective colored sections extends in the axial direction.

In the former case, when reflective materials and non-reflective materials are appropriately used in combination as the zonal materials, the contrast of the black and white stripe patterns is increased by the emission of light from the total station 3 so that the respective prism-holding devices 2 can be identified even at the night time based on the identification information 6. Especially when the use in the dark is supposed, such an embodiment is preferable in which a black zonal material is used as the reflective material and a white zonal material is used as the non-reflective material. When the black and white zonal material is used, the arrangement of the black and white stripe patterns may be suitably changed so that a larger amount of the different identification information 6 can be simply obtained.

In the latter case, the identification information 6 can be added to the pole 5 simply winding one sheet-shaped identifier 6A around the pole 5 so that the easier manufacture of the prism-holding device 2 can be realized. In order to form the black and white zonal material, and the black and white stripe patterns on one sheet-shaped identifier 6A, an all-purpose printer such as an ink-jet printer can be used.

3. As shown in FIG. 1, the total station 3 includes a leveling stand 7 disposed on a tripod, a base 8 arranged on the leveling stand 7, a total station main member (hereinafter referred to as "main body") 9, and a telescope 10 rotatably equipped on the main body 9 centering around a horizontal axis.

Figure 4:
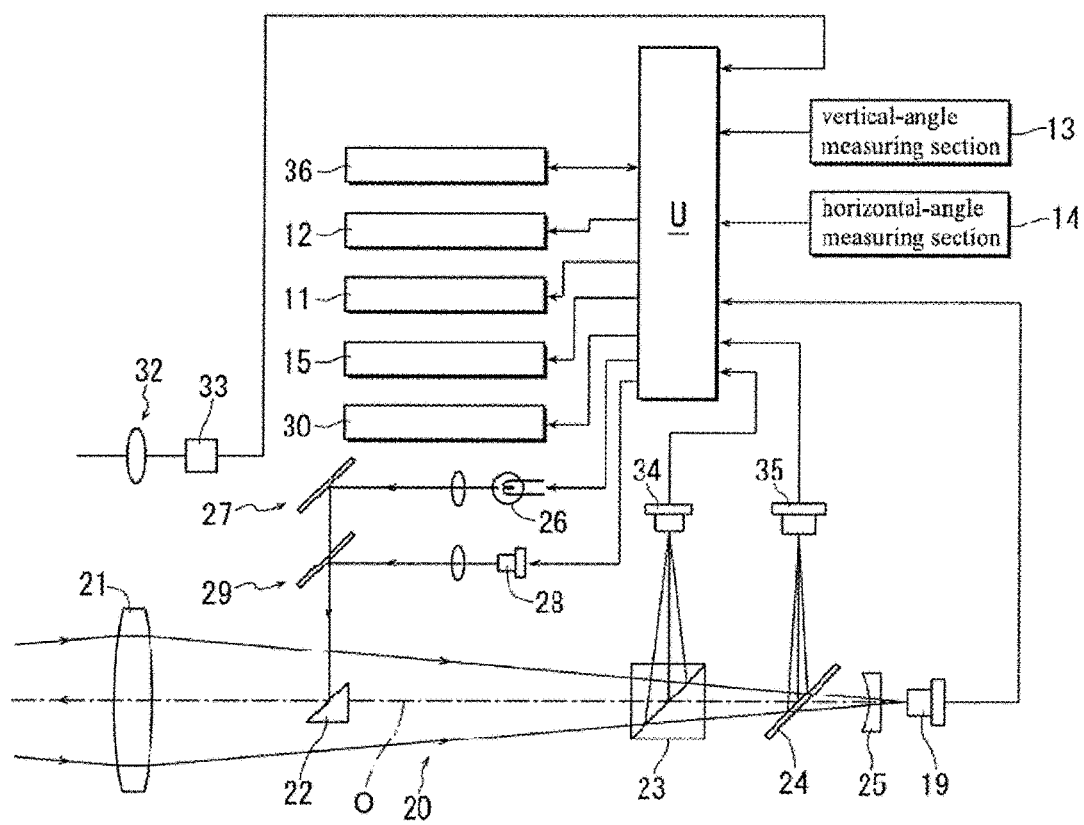
FIG. 4 An illustration of the entire total station of the first embodiment.
Figure 5:
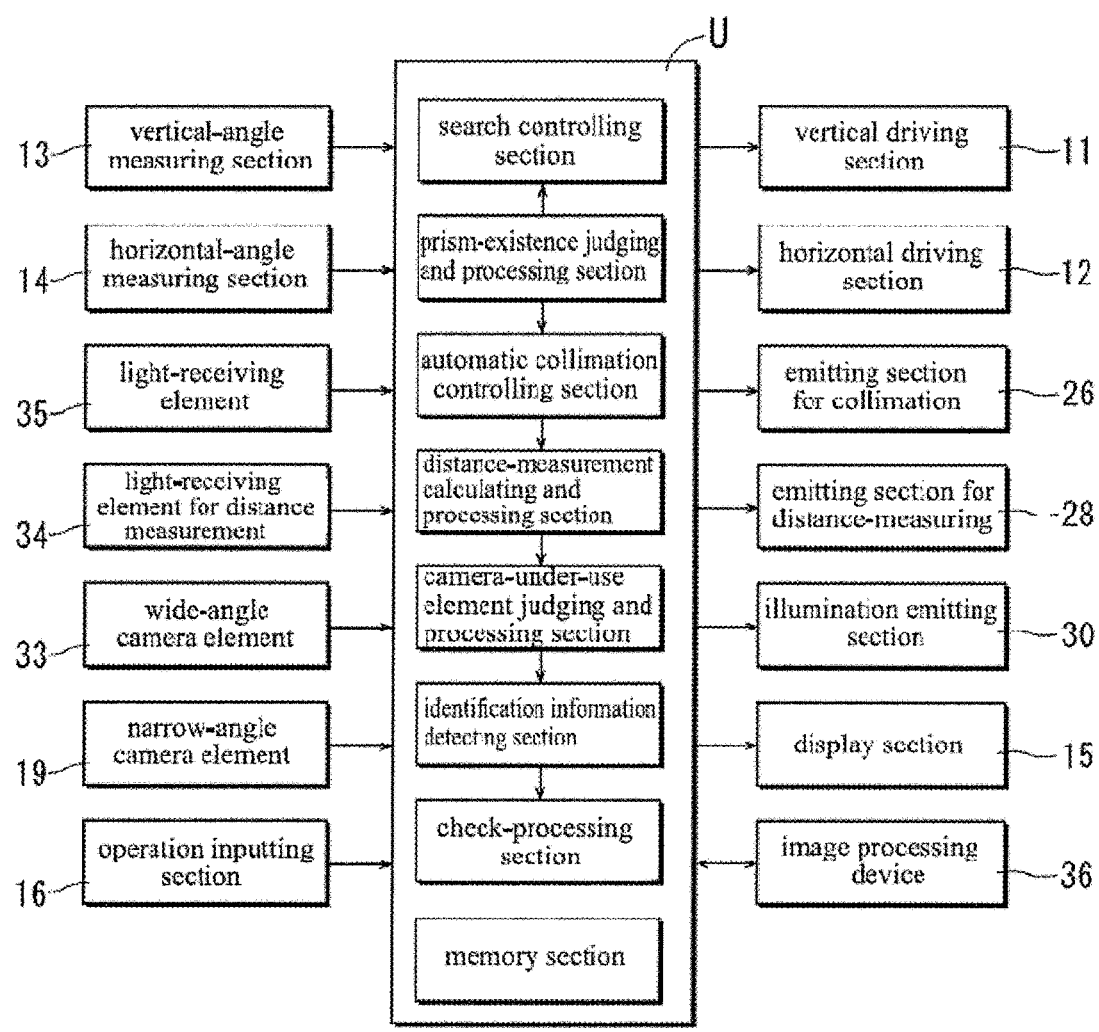
FIG. 5 An illustration of input-output with respect to a control unit of the total station of the first embodiment.

(1) A vertical driving section (vertical survomotor) 11, a horizontal driving section (horizontal survomotor) 12, a vertical-angle measuring section (vertical encoder) 13, and a horizontal-angle measuring section (horizontal encoder) 14 are mounted in the main body 9 (refer to FIGS. 4 and 5). The vertical driving section 11 rotatably drives the telescope 10 around the horizontal axis, and the horizontal driving section 12 rotatably drives the main body 9 in a horizontal direction around a vertical axis. Thereby, the telescope 10 is driven in the horizontal direction with respect to the leveling stand 7, and vertically and rotatably driven. The vertical-angle measuring section 13 measures a vertical angle (of collimation axis) of the telescope 10, and the horizontal-angle measuring section 14 measures a horizontal angle (of collimation axis) of the telescope 10. A display section 15 displaying various images and information, and an operation inputting section 16 (operation inputting unit) are mounted on the rear and lower surface of the main body 9.

(2) As shown in FIG. 1, the telescope 10 includes a first telescoping section 17 collimating a subject to be measured, a second telescoping section 18 having a lower magnification and a wider view range than the first telescoping section 17, and an illumination emitting section 30 (refer to FIGS. 4 and 5).

(2-1) As shown in FIG. 4, the first telescoping section 17 can obtain an image in the collimation direction (telescoped image) by means of a narrow-angle camera element 19 through the optical system 20 of the first telescoping section 17. The optical system 20 of the first telescoping section 17 is configured to have an objective lens 21, a reflective prism 22, a dichroic mirror 23, a beam splitter 24, a focus lens 25 and the narrow-angle camera element 19 in this order on its collimation axis O. A light-projecting optical system 27 for collimation that leads collimation rays from an emitting section 26 for collimation to the collimation axis O of the first telescoping section 17, and a light-projecting optical system 29 for distance-measurement that leads distance-measurement rays from an emitting section 28 for distance-measurement to the collimation axis O of the first telescoping section 17 are incorporated in the optical system 20 of the first telescoping section 17.

(2-2) As shown in FIG. 4, the second telescoping section 18 can obtain an image in the collimation direction or nearly in the collimation direction (wider-view image) by means of a wide-angle camera element 33 acting as an image-taking section through the optical system 32 of the second telescoping section 18.

(2-3) The illumination emitting section 30 emits illumination rays when the image information of the measurement subject is obtained by the narrow-angle camera element 19 and the wide-angle camera element 33. A so-called guide light generally used in a pile driving can be utilized as the illumination emitting section 30.

(2-4) Thereby, the distance-measurement rays and the collimation rays are emitted from the objective lens 21 on the collimation axis O. The distance-measurement rays reflected on the prism 4 of the prism-holding device 2 advance reversely on the optical path the rays have followed for measuring a distance to the prism 4 of the prism-holding device 2, and pass through the objective lens 21 to enter the dichroic mirror 23. Then, the reflected distance-measurement rays entering the dichroic mirror 23 are reflected at a right angle on the same dichroic mirror 23 to enter a light-receiving element for measuring distance 34. In this instance, for calculating the distance to the prism 4 of the prism-holding device 2, reference rays directly enter from the emitting section 28 to the light-receiving element 34 through optical fibers not shown in the drawings similarly to a conventional process.

The collimation rays reflected on the prism 4 of the prism-holding device 2 advance reversely on the optical path the rays have followed for the automatic collimation, and pass through the objective lens 21 and the dichroic mirror 23 and enter a beam splitter 24. The reflected collimation rays entering the beam splitter 24 are reflected on the same beam splitter 24 and enter a light-receiving element (area sensor) 35. An image caught in a telescopic view 37 of the first telescoping section 17 is also input into this light-receiving element 35.

(2-5) The illumination rays reflected on the prism-holding device 2 advance reversely on the optical path the rays have followed, and pass through the objective lens 21, the dichroic mirror 23, the beam splitter 24 and the focus lens 25 to enter the narrow-angle camera element 19 for the image formation of the illuminated prism-holding device. The reflected illumination rays also enter the wide-angle camera element 33 through the optical system 32 of the second telescoping section 18.

(3) A control unit U is built in the main body 9.

(3-1) As shown in FIGS. 4 and 5, from this control unit U, various output signals are output to the vertical driving section 11, the horizontal driving section 12, the emitting section 26 for collimation, the emitting section 28 for distance-measurement, the illumination emitting section 30, the display section 15, and an image processing device 36. On the other hand, to the control unit U, various input signals are input from the operation inputting section 16 (operation inputting unit), the vertical-angle measuring section 13, the horizontal-angle measuring section 14, the light-receiving element 35 (first searching unit), the light-receiving element 34 for distance measurement (second searching unit, distance measuring unit), the wide-angle camera element 33 (second searching unit, camera element, camera element under use), the narrow-angle camera element 19 (second searching unit, camera element under use), and the image processing device 36.

In this case, the image processing device 36 image-processes the information input to the respective elements 19, 33 to 35, and after the processing in the image processing device 36, the image-processed data are returned to the control unit U. The display section 15 displays the images based on the light-receiving element (area sensor) 35, the wide-angle camera element 33 and the narrow-angle camera element 19 by means of the control of the control unit U. During this display, the telescopic view 37 and a cross line 18 showing the collimation axis O are also displayed (refer to FIGS. 6 and 7).

(3-2) As shown in FIG. 5, the control unit U includes a search controlling section (first searching unit), a prism-existence judging and processing section (first searching unit), an automatic collimation controlling section (first searching unit), a distance-measurement calculating and processing section (second searching unit, distance-measuring unit), a camera-under-use element judging and processing section (second searching unit, camera-under-use element judging unit), an identification information detecting section (identification information detecting unit), a check-processing section (checking unit) and a memory section.

The memory section stores a calculation program required for the measurement, a program for the image-processing, various controlling programs, a searching route of the prism 4 of the prism-holding device 2, and image-processing about a searching region of the prism 4. The programs are read out by the respective control sections and the respective processing sections depending on necessity. The required information is properly stored, and the identification information 6 of the desired prism-holding device 2 which is input from the operation inputting section 16 is also stored.

Figure 6:
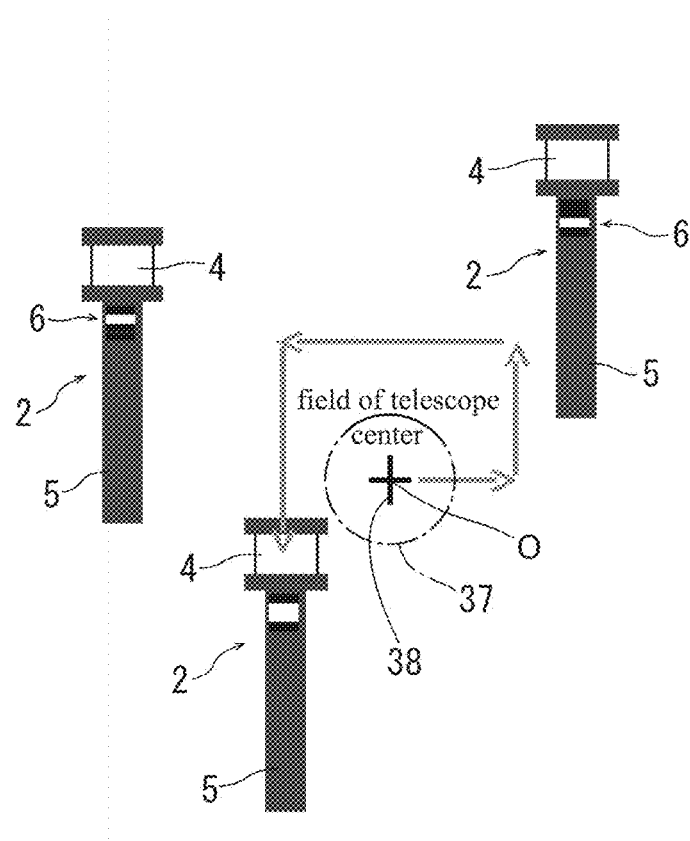
FIG. 6 An illustration showing searching of the prism of the first embodiment.
Figure 7:
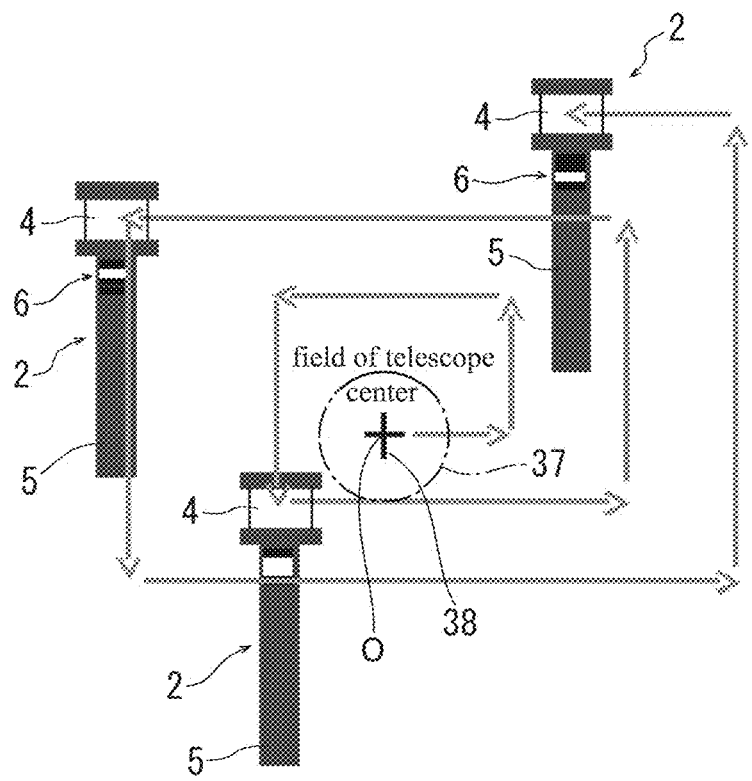
FIG. 7 A drawing showing an operation condition following that shown in FIG. 6.

The search controlling section has a function of searching the prism 4 of the prism-holding device 2 by controlling the vertical driving section 11 and the horizontal driving section 12, while the information is obtained from the vertical driving section 11 and the horizontal driving section 12 in accordance with a specified searching route in a specified searching region. As shown in FIGS. 6 and 7, the pattern of the searching route of the prism 4 (searching pattern) may be an eddy externally facing from the position of the center O (collimation axis) of the telescopic view 37 in the present embodiment. Of course, an exemplary searching pattern may include various aspects in which one pattern gradually moves from one end of the vertical direction to the other while it reciprocates in the horizontal direction, and another pattern gradually moves from one end of the horizontal direction to the other while it reciprocates in the vertical direction.

When at least part of the prism 4 enters the telescopic view 37 (image-taking region), the prism-existence judging and processing section judges, based on the information from the light-receiving element 35 that continues to alternatively take an image when the emitting section 26 for collimation is illuminated and an image when it is switched off, the existence of the prim 4 by extracting only the prism 4 from the contrasting difference of the prism 4 by means of the difference image processing of the two images, stops the searching by the search controlling section, and shifts to the automatic collimation control.

The automatic collimation controlling section calculates a horizontal deviation and a vertical deviation from the collimation axis O centering the prism 4 based on the information from the light-receiving element 35, and these deviations are removed from the driving of the vertical driving section 11 and the horizontal driving section 12. Thereby, the prism 4 center and the center of the telescopic view (collimation axis) O are coincident with each other (automatic collimation).

The distance-measurement calculating and processing section calculates, based on the information from the light-receiving element 34 for distance measurement (reference rays directly enter from the emitting section 28 to the light-receiving element 34 through optical fibers not shown in the drawings, and reflected distance-measuring rays entering the light-receiving element 34), a phase difference between the reflected distance-measuring rays and the reference rays for deriving a distance to the prism 4 based on the phase difference.

The camera-under-use element judging and processing section judges whether the wide-angle camera element 33 or the narrow-angle camera element 19 is used based on the distance to the prism 4 derived in the distance-measurement calculating and processing section. This is because the identification information 6 of the prism-holding device 22 is appropriately obtained at a proper size on the image by effectively utilizing the properties of the wide-angle camera element 33 and the narrow-angle camera element 19.

Figure 8:
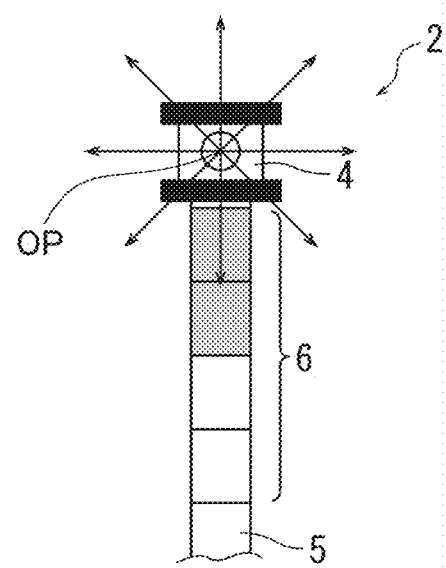
FIG. 8 An illustration showing a method of detecting identification information after prism detection.

The identification information detecting section detects the identification information 6 near the prism 4 from the image information of the camera under use. Specifically, when the relative positions between the prism 4 and the identification information 6 are known (for example, when the prism pole 5 is perpendicular to the ground, and the identification information 6 exists at a position below the prism by ○○mm), the position of the identification information 6 is calculated by utilizing the distance value between the prism 4 and the identification information 6 on the image. After the position is calculated, the identification information 6 is searched from the position by utilizing the distance value. When the relative positions between the prism 4 and the identification information 6 are not known, the identification information detecting section radially searches the identification information 6 from the central point OP of the prism 4 as shown by arrows shown in FIG. 8. Thereby, the identification information 6 can be appropriately found even if the prism pole 5 is inclined.

The check-processing section compares the identification information 6 detected by the identification information detecting section with the identification information 6 of the desired prism-holding device 2 memorized in advance. When these are coincide with each other, the notice that the checked holding device 2 is the desired holding device 2 is displayed on the display section 15, and the above two values are not coincide with each other, the notice that the checked holding device 2 is not the desired holding device 2 is displayed on the display section 15.

4. Then, a method of discriminating the desired prism-holding device in accordance with the first embodiment will be described together with the summary of control of the above control unit U.

(1) In order to discriminate the desired prism-holding device 2, at first, the prism 4 of the prism-holding device 2 is searched under a specified searching region and a specified searching route. For this reason, as shown in FIGS. 6 and 7, the telescopic view 37 moves in an externally-oriented eddy direction from the center position of the telescopic view 37 in the present embodiment.

(2) When the prism 4 is detected during the prism searching (refer to FIG. 6, for example), the automatic collimation is performed. That is, the horizontal driving section 12 and the vertical driving section 11 are driven to orient the center of the telescopic view 37 (collimation axis) toward the center of the detected prism 4. When the center of the telescopic view 37 and the center of the detected prism 4 are coincident with each other, the subject situation is locked where the distance to the detected prism 4 is measured.

(3) When the distance to the detected prism 4 is measured, whether the wide-angle camera element 33 or the narrow-angle camera element 19 is used is judged based on the distance to the prism 4. This is because the identification information 6 at the prism-holding device 2 is properly obtained by the appropriate image information with regard to the distance to the prism 4. Further, the burden of the camera under the use that images the identification information 6 can be reduced.

(4) When the camera element under the use is selected, the identification information 6 (black and white stripe pattern in the present embodiment) added to the pole 5 holding the detected prism 4 is obtained from the image information, and the above identification information 6 and the identification information 6 of the desired prism-holding device 2 are checked with each other. An ordinary template matching which can the checking with respect to a pattern and a shape is used for this checking operation, and this checking operation judges whether the detected prism-holding device 2 is the desired prism-holding device 2 or not.

When the identification information 6 of the detected prism-holding device 2 and the identification information 6 of the desired prism-holding device are judged to be coincide with each other, this judgment that the said detected prism-holding device 2 is the desired prism-holding device is displayed on the display section 15. Thereafter, the total station 3 judges, as the desired one, and utilizes the positional information of the prism 4 of the prism-holding device 2 (a distance to prism 4, an elevation angle and a directional angle) for various judgments such as a construction surface condition, and then the results thereof are displayed on the display section 15.

On the other hand, when the identification information 6 of the detected prism-holding device 2 and that of the desired prism-holding device 2 are not coincide, the detected prism-holding device 2 is judged to be different from the desired prism-holding device 2, and the telescope 10 again searches in accordance with a searching route for detecting the next prism 4 (refer FIG. 7).

(5) Accordingly, even if a plurality of the prism-holding devices 2 are present on a construction site, the desired prism-holding device 2 can be correctly identified among them without an error when the subject measurement system 1 is used so that the various proper judgments can be made by obtaining the information based on the prism-holding devices 2.

Figure 9:
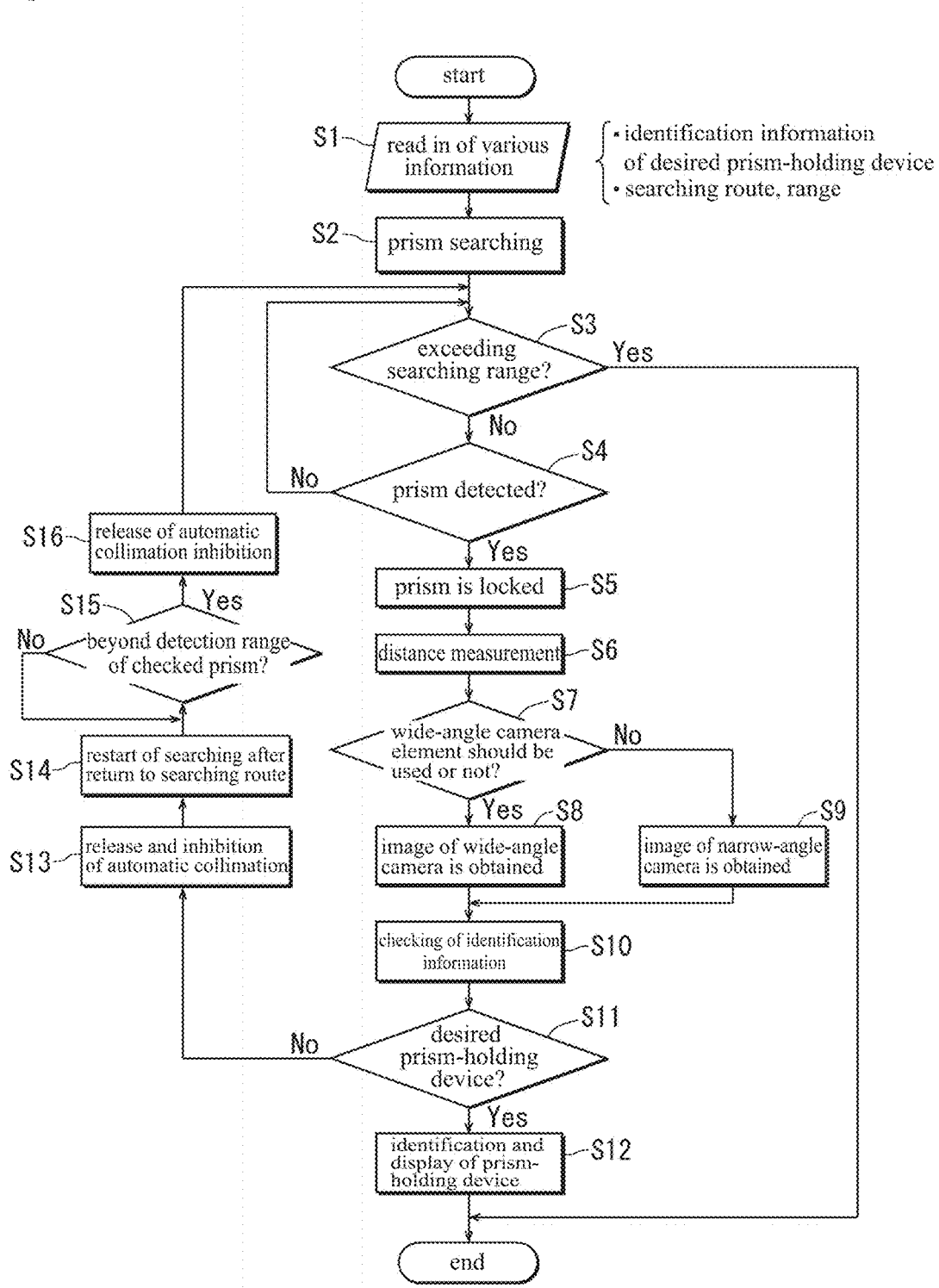
FIG. 9 A flow chart showing an example of controlling the total station of the first embodiment.

5. An example of control of the control unit U will be specifically described referring to a flow chart shown in FIG. 9. "S" denotes a step.

At first, at S1, the various information are loaded including the identification information 6 of the desired prism-holding device 2, the searching route of the prism-holding device 2 and the searching range. After the loading, the searching of the prism-holding device 2 starts at S2, and whether or not the searching is beyond the setup searching range is judged at S3. In case of "YES" at S3, the control is finished because the search is beyond the setup range. On the other hand, in case of "NO" at S3, whether or not the prism 4 of the prism-holding device 2 is detected is judged at S4 for locating the device 2 which is possibly the desired prism-holding device 2. In case of "NO" at S4, the processing returns to S3, and the search continues before the search is beyond the setup range. On the other hand, in case of "YES" at S4, the prism 4 which is detected is automatically collimated and locked (fixed under the condition the collimation axis "O" and the center of the prism 4 are coincident with each other) at S5. Then, at S6, a distance to the prism 4 of the prism-holding device 2 is measured.

When the distance to the prism 4 of the detected prism-holding device 2 is measured (S6), whether or not the wide-angle camera element 33 is used is judged at S7 by utilizing the measured distance of S6 because the proper image information is necessary for obtaining the identification information 6 without fail. In the present embodiment, the camera to be used is selected in a switching manner from the wide-angle camera element 33 and the narrow-angle camera element 19 by calculating the size of the identification information 6 on the respective camera images from the information including an angular field of the camera, a resolution of the camera and the size of the identification information 6 (identifier) which are known, and the measured distance value. Thereby, a burden of the camera under use which must take the identification information 6 can be significantly reduced. In case of "YES" at S7, the wide-angle camera information is obtained by using the wide-angle camera element 33 at S8, and in case of "NO" at S7, the narrow-angle camera information is obtained by using the narrow-angle camera element 19 at S9.

Then, at S10, the identification information 6 positioning near the prism 4 is located from the image information at S8 or S9. This identification information 6 and the identification information 6 of the desired prism-holding device 2 setup in advance are checked with each other by template matching, and the coincidence of the checking is judged at S11.

In case of "YES" at S11, the display section 15 displays at S12 that the detected prism-holding device 2 is the desired prism-holding device 2. Thereafter, the total station judges that the positional information of the prism 4 of the detected prism-holding device 2 (the distance to the prism 4, the elevation angle and the directional angle) is the desired one, utilizes the information for the various judgment such as appropriateness of the construction surface condition, and displays on the display section 15.

On the other hand, incase of "NO" at S11, the locking to the prism 4 of the prism-holding device 2 is released (automatic collimation release) together with the inhibition of the automatic collimation at S13. The processing is returned to the searching route for starting the searching of the prism 4 again at S14. Then, at S15, after the positional information is moved until the prism 4 of the checked and detected prism-holding device 2 does not exist (until the prism 4 of the checked and detected prism-holding device 2 is not detected) in the telescopic view 37 (S15), the automatic collimation inhibition is released (S16), and the processing returns to an ordinary situation of the searching condition for the prism 4 of the prism-holding device 2 (S3).

Figure 14:
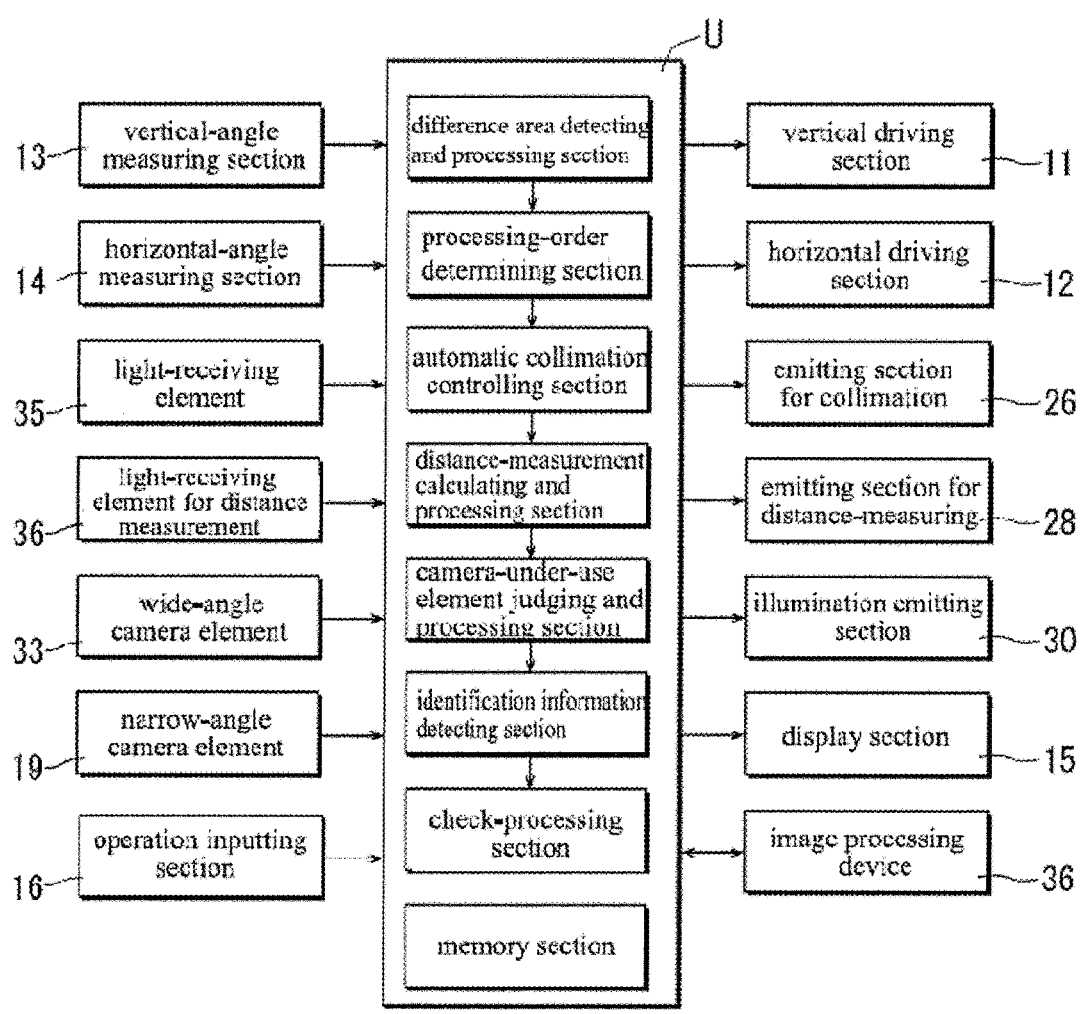
FIG. 14 An illustration of input-output with respect to a control unit of a total station of the third embodiment.
Figure 15:
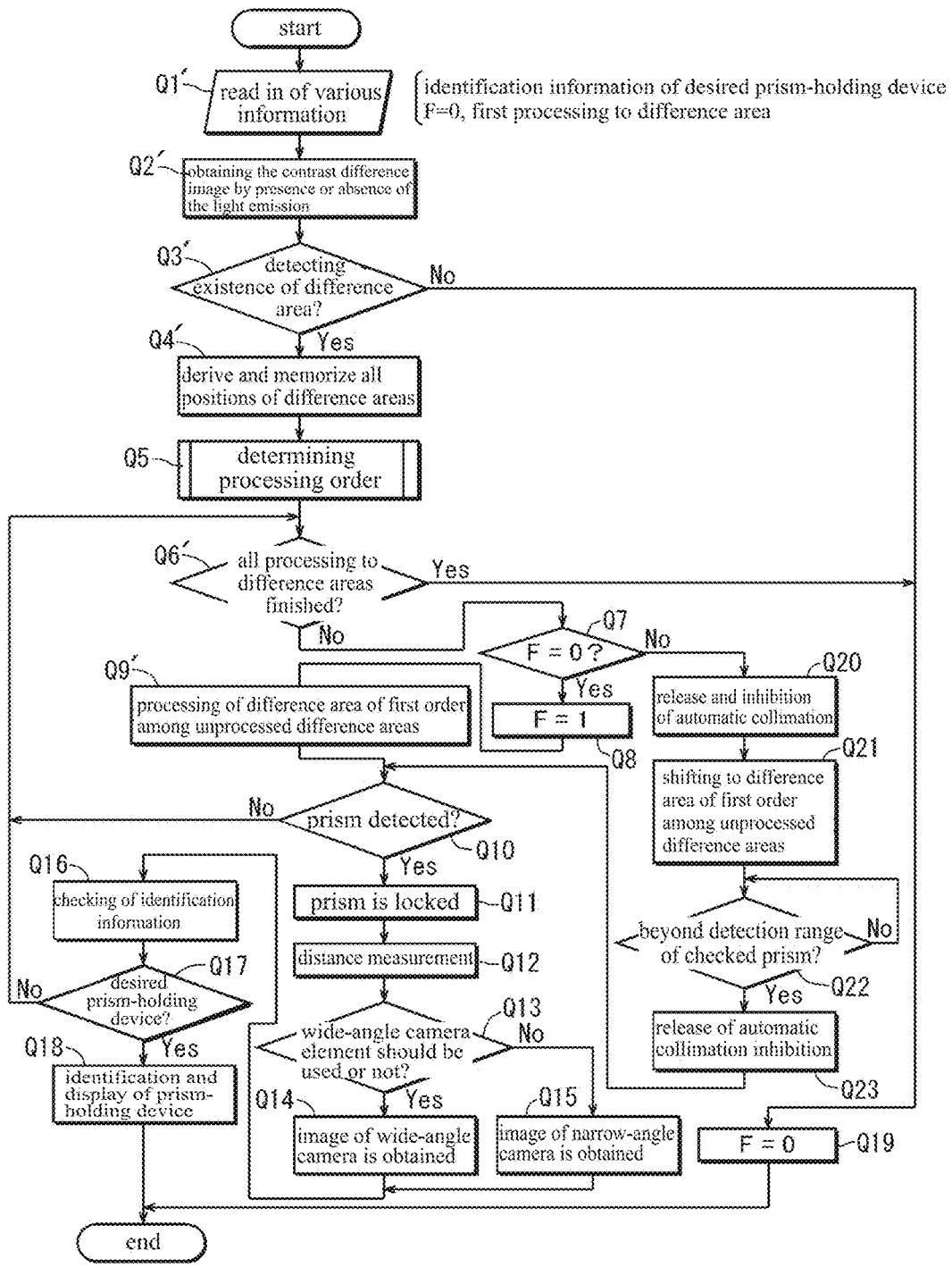
FIG. 15 A flow chart showing an example of controlling the total station of the third embodiment.
Figure 16:
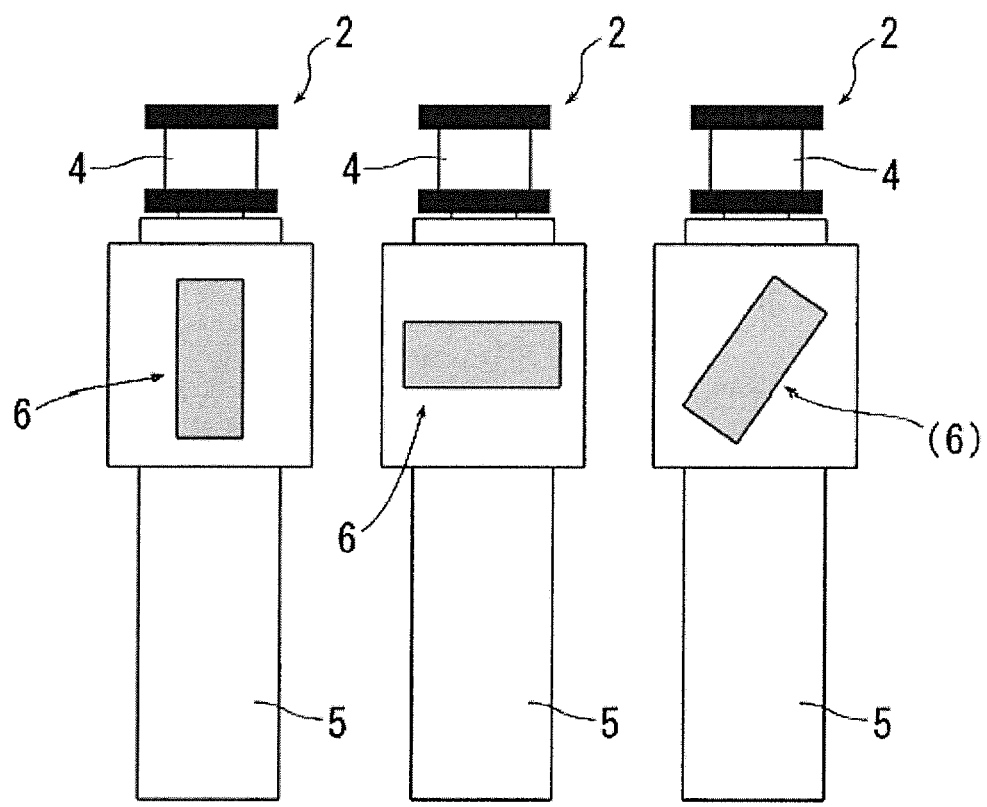
FIG. 16(a), FIG. 16(b) and FIG. 16(c) Illustrations explaining the prism-holding device of a fourth embodiment. Specifically, identification information of a prism-holding device of FIG. 16(a) is different from that of FIG. 16(b) and FIG. 16(c).
Figure 17:
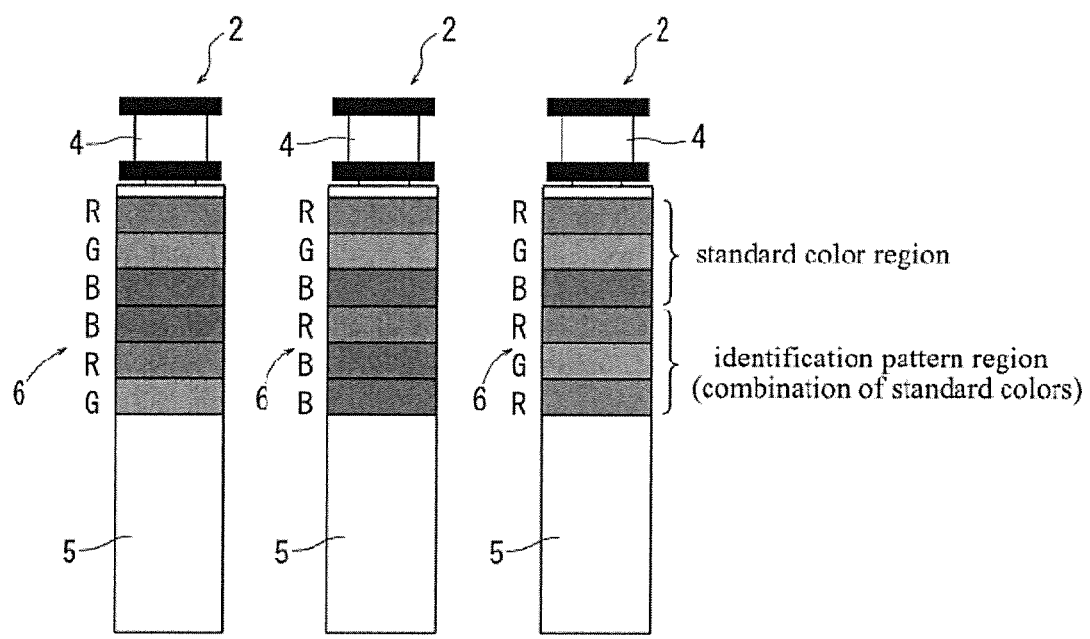
FIG. 17(a), FIG. 17(b) and FIG. 17(c) Illustrations explaining the prism-holding device of a fifth embodiment. Specifically, identification information of a prism-holding device of FIG. 17(a) is different from that of FIG. 17(b) and FIG. 17(c).
Figure 18:
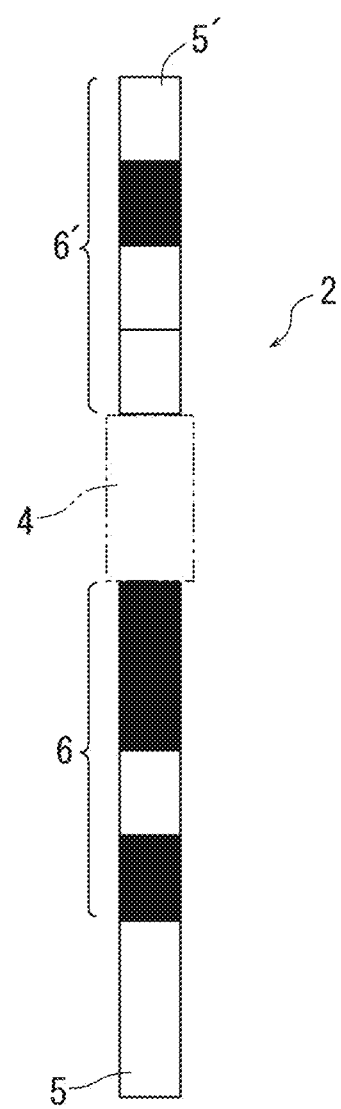
FIG. 18 An illustration explaining the prism-holding device of a sixth embodiment.
Figure 19:
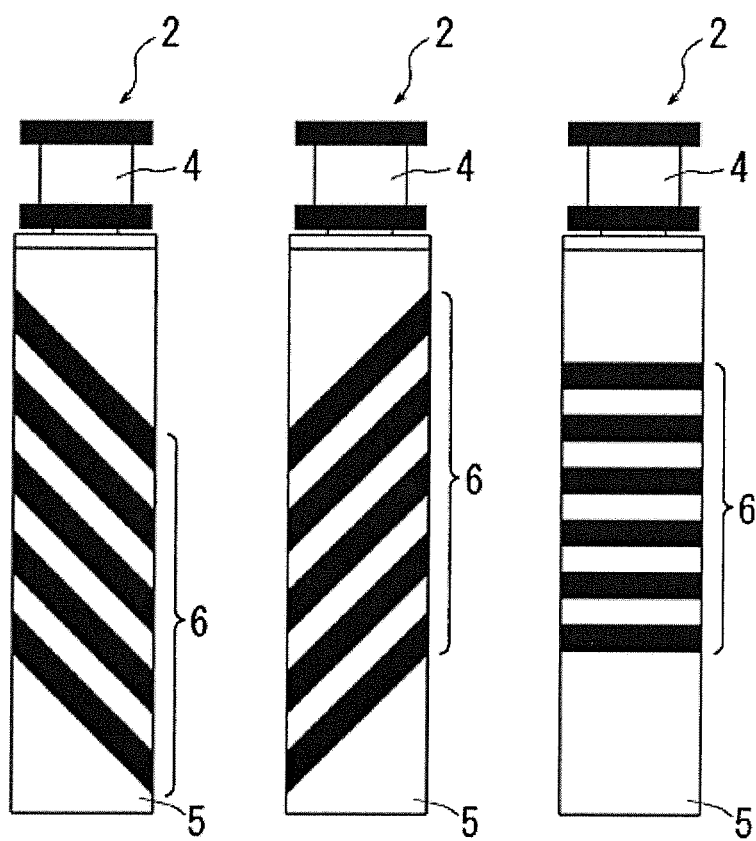
FIG. 19(a), FIG. 19(b) and FIG. 19(c) Illustrations explaining the prism-holding device of a seventh embodiment. Specifically, identification information of the prism-holding device of FIG. 19(a) is different from those of FIGS. 19(b) and 19(c).
Figure 20:
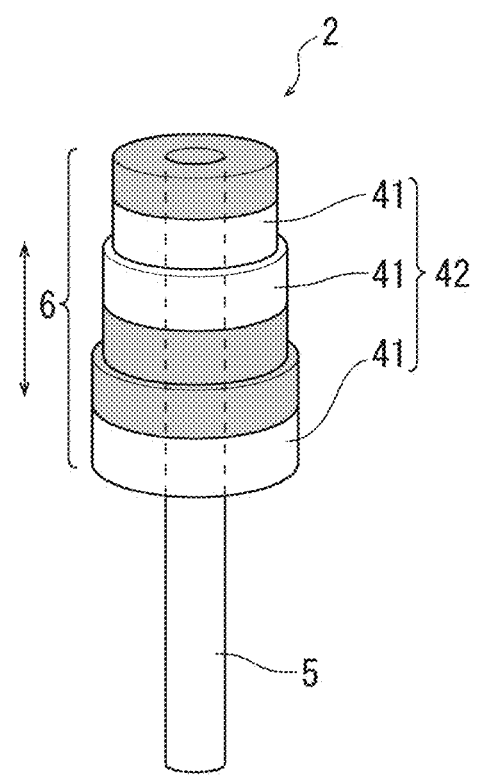
FIG. 20 An illustration explaining the prism-holding device of an eighth embodiment.
Figure 21:
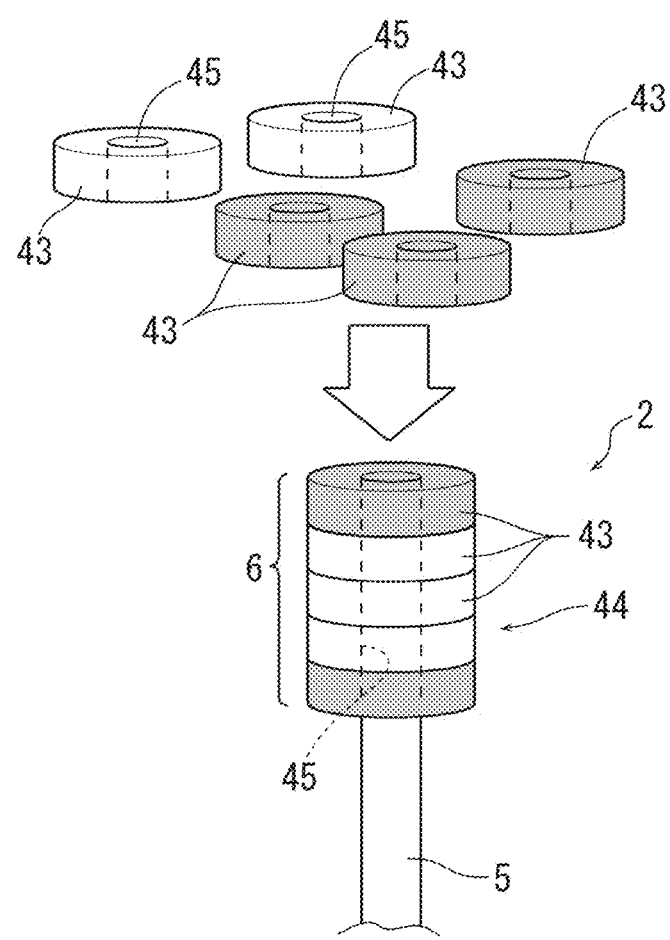
FIG. 21 An illustration explaining the prism-holding device of a ninth embodiment.
Figure 22:
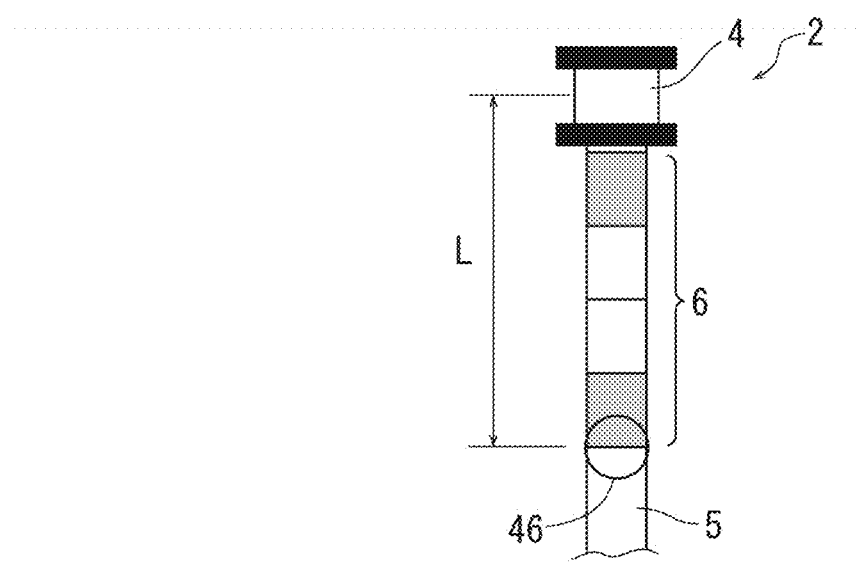
FIG. 22 An illustration explaining the prism-holding device of a tenth embodiment.

6. FIGS. 10 to 13 show a second embodiment, FIGS. 14 and 15 show a third embodiment, FIG. 16 shows a fourth embodiment, FIG. 17 shows a fifth embodiment, FIG. 18 shows a sixth embodiment, FIG. 19 shows a seven embodiment, FIG. 20 shows an eighth embodiment, FIG. 21 shows a ninth embodiment, and FIG. 22 shows a tenth embodiment. In the respective embodiments, the description of an element same as that of the first element will be omitted by attaching the same symbol thereto.

7. In the second embodiment shown in FIGS. 10 to 13, the detection of the desired prism-holding device 2 can be promptly performed by utilizing the wide-angle camera image information, for restricting the existence region of the prism 4 of the prism-holding device 2 or the identification information 6 and by searching the identification information 6 in the restricted existence region or its neighborhood.

Figure 10:
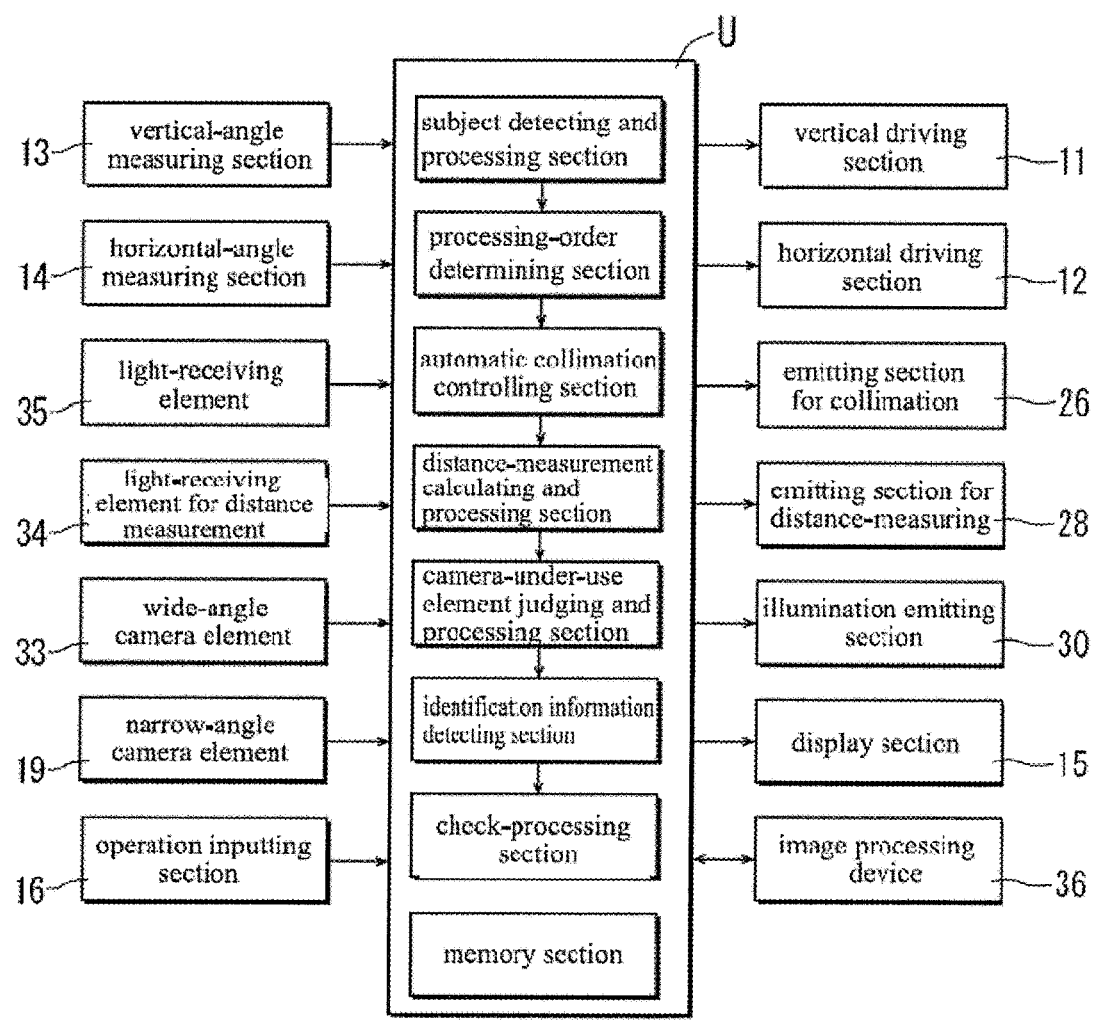
FIG. 10 An illustration of input-output with respect to a control unit of a total station of a second embodiment.

(1) Accordingly, in the second embodiment, as shown in FIG. 10, similarly to the first embodiment, the configuration information from the operation inputting section 16, the angle information of the vertical-angle measuring section 13, the angle information of the horizontal-angle measuring section 14, the light-receiving information from the light-receiving element 35 (area sensor), the light-receiving information from the light-receiving element 34 for distance measurement, the wide-angle camera image information from the wide-angle camera element 33, the narrow-angle camera image information from the narrow-angle camera element 19 and the image processing information from the image processing device 36 are input to the control unit U. The various output signals are output from the control unit U to the vertical driving section 11, the horizontal driving section 12, the emitting section 26 for collimation, the emitting section 28 for distance-measuring, the illumination emitting section 30, the display section 15, and the image processing device 36.

(2) The control unit U includes a subject detecting and processing section (a unit of judging an estimation region of existence of a reflection target), a processing-order determining section (a processing-order determining unit), an automatic collimation controlling section, a distance-measurement calculating and processing section, a camera-under-use element judging and processing section, a check-processing section, and a memory section. The automatic collimation controlling section, the distance-measurement calculating and processing section, the camera-under-use element judging and processing section, the identification information detecting section and the check-processing section, and the memory section have functions similar to those of the first embodiment, and the subject detecting and processing section and the processing-order determining section have the following characteristic functions.

When the identification information 6 possessed by the prism 4 of the prism-holding device 2 or by the prism-holding device 2 exists as a detecting subject in the image information obtained as the wide-angle camera image information, the subject detecting and processing section has a function of detecting the above existence. The prism-holding devices 2 are not searched in accordance with a specified searching route in a single uniform way, but what may be possibly the prism-holding devices 2 are located at once. This is because what may be possibly the prism-holding devices 2 are directly accessed for discriminating whether the subject is the desired prism-holding device 2 or not.

The processing-order determining section has a function of determining the processing order in which the detected subject located at the subject detecting and processing section is judged to be the desired prism-holding devices 2 or not, for performing the effective identification processing. The specific processing method includes, in addition to the contents of FIGS. 12 and 13, after excluding, from the wide-angle camera image information, areas such as sky and ground where the prism 4 (or identification information 6) may not exist in view of the perpendicular angle, the identification processing, and the determining the processing order of the detected subjects from the center or from the edge of the image information.

Figure 11:
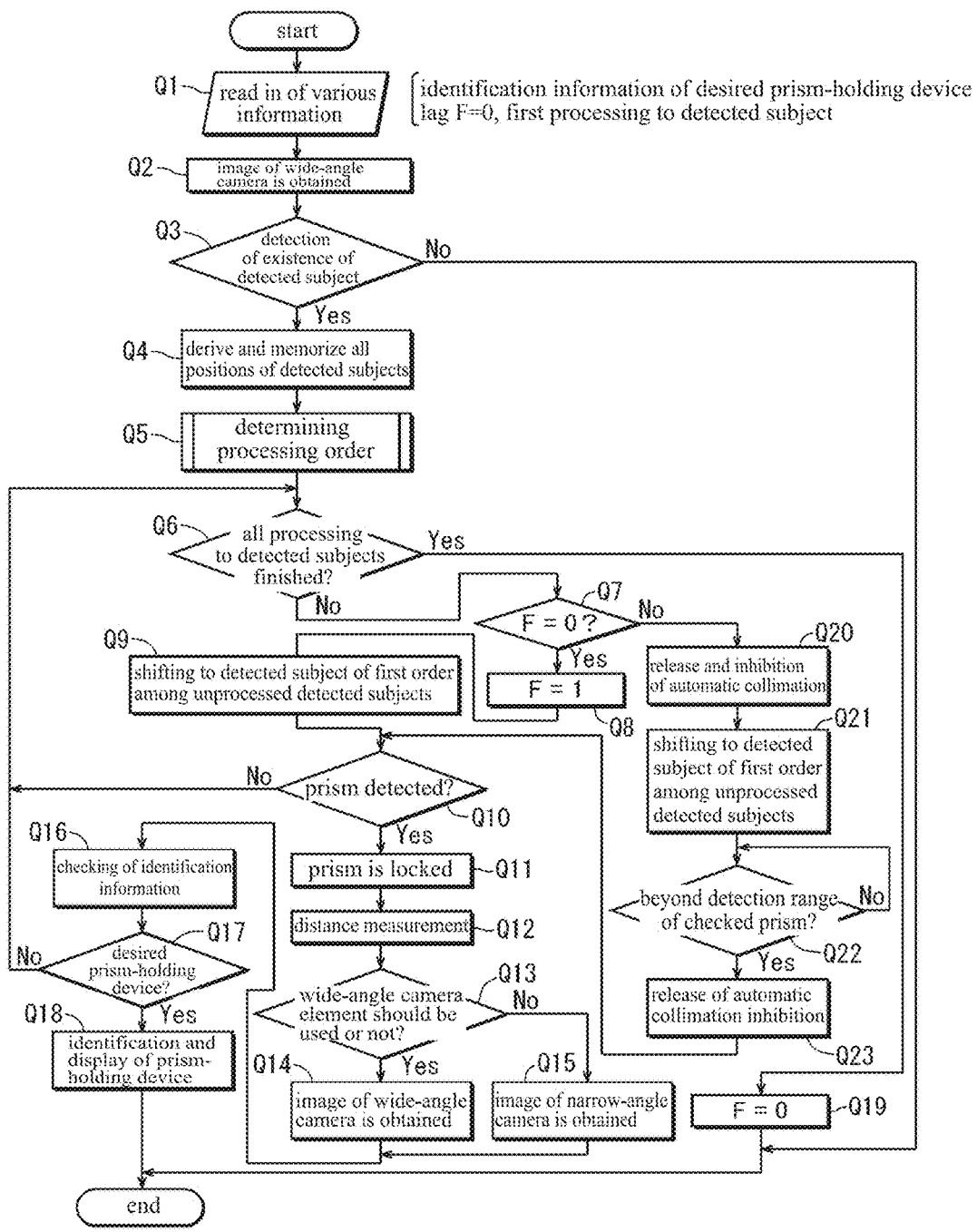
FIG. 11 A flow chart showing an example of controlling the total station of the second embodiment.

(3) An example of controlling the above control unit U will be specifically described referring to a flow chart of FIG. 11. "Q" denotes a step.

At first, at Q1, various information is read in such as identification information 6 of the desired prism-holding device 2 and a flag F=0 (a first processing to the detected subject existing in the wide-angle camera image information). After the finish of the read-in, the wide-angle camera image information is obtained by using the wide-angle camera element 33 at Q2. The prism-holding devices 2 in a wide range can be detected at once by the image information having a wide angle of field.

When the wide-angle camera image information is obtained (Q2), it is judged whether the prism 4 of the prism-holding device 2 (the identification information 6 possessed by the prism-holding device 2) can be detected or not (exists or not) as a detected subject in the wide-angle camera image information, by using a method such as pattern matching, at Q3. This is because what may be possibly the prism-holding devices 2 are detected at once. In case of "NO" at Q3, the control is finished because the detected subject is judged to be absent in the wide-angle camera image information. On the other hand, in case of "NO" at Q3, the positional information of all the detected subjects (a distance to prism 4, an elevation angle and a directional angle) are obtained and memorized at Q4 because the detected subject is judged top be exist.

Figure 12:
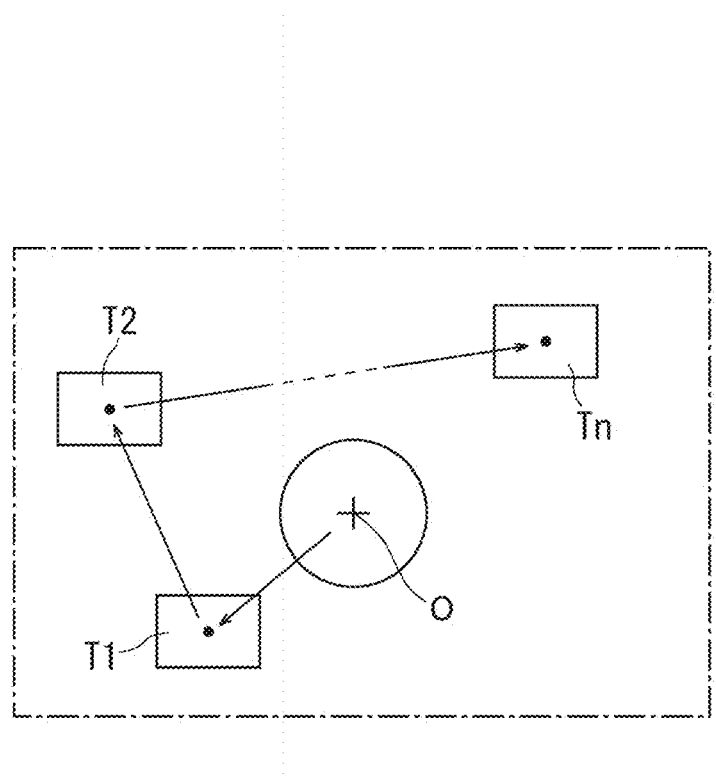
FIG. 12 An illustration showing an identification processing according to a ranking example to test subjects.
Figure 13:
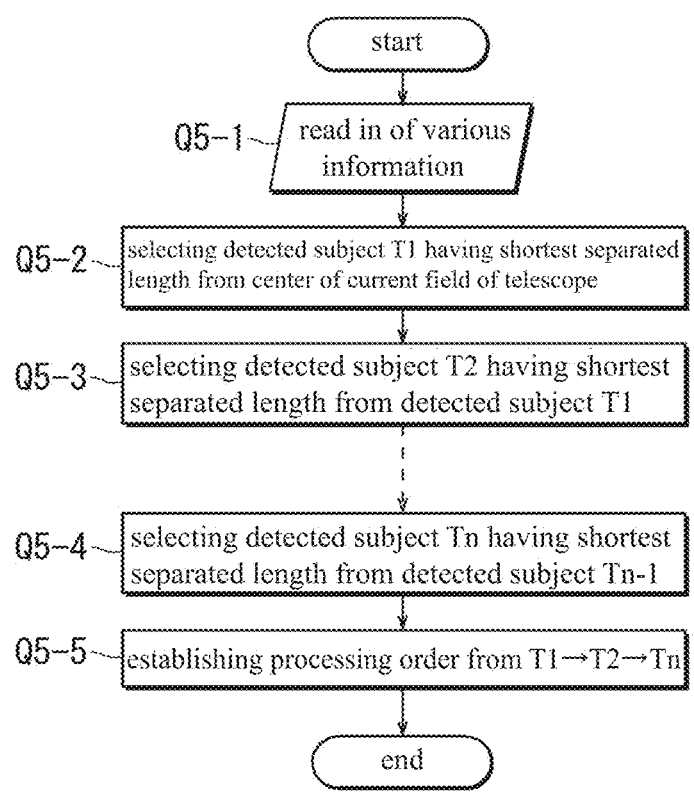
FIG. 13 A flow chart showing a method of determining processing ranking of a third embodiment.

Then, at Q5, the processing order is determined for judging whether the subject detected at Q3 is a desired prism-holding device 2 or not based on the information at Q4. For this processing order determination, a method is used which is schematically depicted in FIG. 12 and of which a content is shown in a flow chart of FIG. 13.

Specific description will be provided. At first, when the various information of Q4 is read in at Q5-1, a detected subject T1 having the shortest separated length from the current position of the center O of the telescopic view 37 is selected (Q5-2). Then, a detected subject T2 having the shortest separated length from the detected subject T1 selected at Q5-2 is selected (Q5-3). These processings are repeated for selecting the final detected subject Tn (Q5-4). Thereafter, the processing order is assigned to as T1, T2 . . . Tn in this order (Q5-5). In this manner, as shown in arrows in FIG. 12, the telescopic view 37 (image-taking region) can be effectively moved with respect to the respective detected subjects so that the desired prism-holding device 2 can be promptly located.

After the above order determination processing (Q5) is finished, the processing of judging whether all of the detected subjects are the desired prism-holding devices 2 or not is judged to be finished or not at Q6. At the beginning, "NO" is provided at Q6, and in this case, "F=0" is satisfied or not is judged at Q7. This is because the results of the identification processings with respect to the detected subject are different between the first time and the other times than the first time. At the beginning, "YES" is provided at Q7 so that, after "F=1" is established at Q8, the telescopic view 37 is moved, at Q9, toward the detected subject having the top priority among the un-processed detected subjects based on Q5. Then, at the next Q10, whether the prism 4 is detected or not in the detected subject is judged in order to locate the prism-holding device 2 which may be possibly the prism-holding device 2. When "NO" is provided at Q10, the processing is returned to Q6 where the processing for detecting the prism 4 continues for all the subjects detected at Q4. On the other hand, when "YES" is provided at Q10, the prism 4 of the prism-holding device 2 is detected so that the detected prism 4 is automatically collimated and is locked. Then, at the next Q12, the distance to the prism 4 of the above detected prism-holding device 2 is measured.

When the distance to the prism 4 of the detected prism-holding device 2 is measured (Q12), whether the use of the wide-angle camera element 33 or not is judged, at Q13, by utilizing the distance measured at Q12 similar to the first embodiment. When "YES" is provided at Q13, the wide-angle camera image information is obtained by using the wide-angle camera element 33 at Q14, and when "NO" is provided at Q13, the narrow-angle camera image information is obtained by using the narrow-angle camera element 19 at Q15.

Then, at Q16, the identification information 6 positioned near the prism 4 is located from the image information at Q14 or Q15, and this identification information 6 and the identification information 6 of the desired prism-holding device 2 setup in advance are checked by using the template matching. At the next Q17, the coincidence of the checking is judged.

When "NO" is provided at Q17, the processing is returned to Q6 where the identification processing on other detected subjects are repeated. On the other hand, when "YES" is provided at Q17, the display section displays at Q18 that the checked and detected prism-holding device 2 is the desired prism-holding device 2. Thereafter, the total station 3 judges that the positional information of the prism 4 of the detected prism-holding device 2 (the distance to the prism 4, the elevation angle and the directional angle) is desired one, and displays the results at the display section 15 by utilizing the positional information on the various judgment.

"YES" at Q6 means that the identification processing for the judgment whether each of all the detected subjects is the desired prism-holding device 2 or not is finished. In this instance, the flag F is reset (F=0) for terminating the above control.

"NO" at Q7 means that the processing for detected subject is not a first time. Accordingly, in this instance, the lock to the prism 4 to which the processing has been conducted is released (release of automatic collimation) and the automatic collimation is prohibited at Q20. Then, at the next Q21, the telescopic view 37 is moved toward the detected subject having the top priority among the un-processed detected subjects based on the information of Q5. When the prism 4 of the checked and detected is judged to be not detected by the above movement (Q22), the automatic collimation inhibition is released (Q23), and the processing is returned to Q10. Then, the detection of the prism 4 to the next detected subject starts.

8. An alternative example of the second embodiment may be provided in which the subject matter of the second embodiment is applied not to the wide-angle camera image information, but to the prism 4 appearing in the telescopic view 37.

That is, there may be a case in which a plurality of the prism-holding devices 2 are present not in such a wide area which appear in the wide-angle camera image information, but are present in such a small area which appear in the telescopic view 37, and the desired prism-holding device 2 is identified among them. In such a case, the desired prism-holding device 2 is promptly identified among the plurality of the prism-holding devices 2, by handling the respective prisms 4 appearing in the telescopic view 37, similarly to the "detected subjects" in the second embodiment.

In this case, the automatic collimation is performed in an appropriate region for properly locking the respective prisms 4.

9. In the third embodiment shown in FIGS. 14 and 15, the detection of the desired prism-holding device 2 is promptly performed by utilizing the image information having contrast difference for restricting the existing region of the prism 4 of the desired prism-holding device 2 (a difference area obtained from the image information having the contrast difference), and by searching the identification information 6 near the restricted existing region.

(1) In the third embodiment, as shown in FIG. 14, similarly to the first and the second embodiments, the configuration information from the operation inputting section 16, the angle information of the vertical-angle measuring section 13, the angle information of the horizontal-angle measuring section 14, the light-receiving information from the light-receiving element 35, the light-receiving information from the light-receiving element 34 for distance measurement, the wide-angle camera image information from the wide-angle camera element 33, the narrow-angle camera image information from the narrow-angle camera element 19 and the image processing information from the image processing device 36 are input to the control unit U. The various output signals are output from the control unit U to the vertical driving section 11, the horizontal driving section 12, the emitting section 26 for collimation, the emitting section 28 for distance-measuring, the illumination emitting section 30, the display section 15, and the image processing device 36.

(2) As shown in FIG. 14, the control unit U includes a difference area detecting and processing section (a unit of judging an estimation region of existence of a reflection target), a processing-order determining section, an automatic collimation controlling section, a distance-measurement calculating and processing section, a camera-under-use element judging and processing section, a check-processing section, and a memory section. The processing-order determining section, the automatic collimation controlling section, the distance-measurement calculating and processing section, the camera-under-use element judging and processing section, the identification information detecting section and the check-processing section, and the memory section have functions similar to those of the second embodiment, and the difference area detecting and processing section has the following characteristic functions.

That is, the difference area detecting and processing section has a function of receiving the image information having contrast difference obtained at the wide-angle camera element 33 by means of with or without the light emission in a short period of time (ON, OFF), and detecting the difference area from the image information having contrast difference. The detection of the difference area can suppose that the enables the difference area is an existing region. The desired prism-holding device 2 can be located more promptly, by conducting the search to the difference area similarly to the second embodiment, than a case where the prism 4 is searched in accordance with the specified searching route in the single uniform way.

In this case, the illumination emitting section 30 may be utilized for blinking on and off the light in a short period of time during the imaging of the image having the contrast difference.

(3) An example of controlling the control unit U is shown in a flow chart of FIG. 15 wherein the subject matter of this example is different from the second embodiment only in that, as apparent from FIG. 15, the prism 4 existing region is judged by using the "obtaining the contrast difference image by presence or absence of the light emission" and the "difference area" obtained by the contrast difference image in place of "obtaining the wide-angle camera image" and "detected subject" in the flow chart of FIG. 11. Accordingly, in the flow chart of FIG. 15, the same symbol is attached to the same step, and the steps including the "obtaining the contrast difference image by presence or absence of the light emission" and the "difference area" in place of "obtaining the wide-angle camera image" and "detected subject" are denoted by adding ['] to the same step symbols, and their description is omitted.

10. FIG. 16 shows the prism-holding device 2 having increased identification performance in the fourth embodiment. Each of the identification information 6 of the prism-holding devices 2 includes a single-shaped pattern that is different from one another. The patterns (identification information) in FIG. 16 are rectangular. FIG. 16(*a*) shows the rectangular pattern which is arranged such that its longitudinal direction faces the axial direction of the pole 5, FIG. 16(*b*) shows the rectangular pattern which is arranged such that its longitudinal direction is perpendicular to the axial direction of the pole 5, and FIG. 16(*c*) shows the rectangular pattern which is arranged such that the pattern obliquely intersects with the axial direction of the pole 5.

In this manner, the formation of the fine patterns becomes unnecessary. In addition, even if some loss of the identification information 6 on the image takes place due to an external disturbance, each pattern can identified. Further, because of the single-shaped pattern, the size of the pattern may be enlarged to enable the identification even when the distance to the prism-holding devices 2 is larger.

While the so-called 360° type prism 4 is used in case of FIG. 16, a one-element prism having the function on the same side of the pattern is sufficient in view of the use of the shaped-pattern acting as the identification information 6.

Although the shaped-pattern acting as the identification information 6 is added to the external surface of the pole 5 in the above example, the shapes themselves of every prism 4 may be different from one another.

11. FIG. 16 shows the prism-holding device 2 of the fifth embodiment which depresses the reduction of the identification performance even when the change of color tone occurs due to outside light and darkness. In this fifth embodiment, as the identification information 6 at one end of the pole 5, a standard color region and an identification pattern region are continuously formed from the prism 4 side to the other. In the identification pattern region, a stripe pattern including, for example, red (R), green (G) and blue (B) is formed, and in the identification pattern region, every stripe pattern having the different colored-stripe pattern prepared by various combination among red (R), green (G) and blue (B) is formed on each of the prism-holding devices 2. In this manner, even if the color tone is changed in the respective colored parts on the standard color region and the identification pattern region due to the outside light and the darkness, the change occurs on every colored part on the standard color region and the identification on the same condition so that the colored pattern formed by the colored parts in the identification pattern region can be recognized by selecting the same pattern of the respective colored parts of red (R), green (G) and blue (B) in the standard color region from the respective colored parts of the identification pattern region. Accordingly, even if the color-tone change in the respective colored parts occurs in the identification information 6 due to the outside light and the darkness, the reduction of the identification performance can be depressed.

Of course, in this case, colors other than the above combination of red (R), green (G) and blue (B) can be used as standard colors in the standard color region. For example "black and white" may be used as the standard colors ton provide four kinds of the identification patterns.

12. FIG. 18 shows the prism-holding device 2 of the sixth embodiment which reduces the search burden of the identification information 6 based on the prism 4 together with the increase of the identification performance. In the prism-holding device 2 of the sixth embodiment, another pole 5' is disposed on the reverse side of the original pole 5 based on the prism 4 for forming the black and white stripe pattern acting as the identification information 6. On the other hand, the stripe pattern (reversed code) reversed with respect to the black and white stripe pattern on the pole 5 is formed as the identification information 6' on the pole 5'. Specifically, the stripe pattern of "black, black, white, black" is formed on the pole 5 in the direction separated from the prism 4 (downward direction in FIG. 18) as the identification information 6. On the other hand, the stripe pattern of "white, white, black, white" is formed on the pole 5' in the direction separated from the prism 4 (upward direction in FIG. 18) as the identification information 6'.

In this manner, the identification performance can be increased by using the prism-holding device 2 of the sixth embodiment compared with the case of only the identification information 6 on the pole 5. Further, since the pole 5 added with the identification information 6 and the pole 5' added with the identification information 6' are disposed on the both sides of the prism 4, the region for searching the identification information 6 can be reduced to decrease its burden after the detection of the prism 4 (also refer to FIG. 8). This function similarly works even when the pole 5 of the prism-holding device 2 is inclined so that the identification information 6 can be easily detected also when the pole 5 is inclined and its identifying ability is increased.

13. The prism-holding devices 2 of the seventh embodiment shown in FIG. 19 possess the increased identifying ability of the identification information 6. In the prism-holding devices 2 of the seventh embodiment (refer to FIGS. 19(*a*), (*b*) and (*c*)), spiral patterns of belt-shaped equally-interval black and white colored sections are formed, as the identification information 6, on the external surfaces of the poles 5. The respective prism-holding devices 2 have the different stripe patterns in their inclination directions of the belt-shaped colored sections and intervals when they are opposed to each other based on their spiral patterns. The identification that is resistant to the disturbance can be performed when the inclination directions of the belt-shaped colored sections and intervals are analyzed by two-dimensional frequency analysis.

14. The prism-holding device 2 of the eighth embodiment shown in FIG. 20 can be made compact during non-use. This prism-holding device 2 has a telescopic structure including a plurality of cylindrical members 41 having different diameters. Black and white belt-shaped colored sections are added on the external surfaces of the respective cylindrical members 41, and the identification information 6 is constituted by the entire belt-shaped colored sections of the plurality of the cylindrical members (telescopic structure 42). A plurality of these telescopic structures 42 having the different identification information 6 are prepared, and the respective telescopic structures 42 are setup by insertion into one external end of the pole 5.

In this manner, while the identification information 6 is simply configured by setting up the telescopic structure 42 on the pole 5, the prism-holding device 2 can be made compact by the shortening by removing the telescopic structures 42 during the non-use. The prism is omitted in FIG. 20.

A variety of black and white stripe patterns (identification information 6) can be formed by adjusting the telescopic condition of the telescopic structures 42

15. The prism-holding device 2 of the ninth embodiment shown in FIG. 21 can simply form a variety of identification information 6. This prism-holding device 2 has a structure 44 including a plurality of stacked thick circular plates 43 that are setup at one external end of the pole 5. Penetration apertures 45 are formed through the respective thick circular plates 43 at their centers in the diameter direction, and female screws are formed on the internal circumferential surfaces of the penetration apertures 45, and each of the thick circular plates 43 is colored with black or white. One the other hand, a male screw is formed around on one external end surface of the pole 5 where the internal circumferential surface of the penetration apertures 45 of the thick circular plates 43 is screwed so that the structure 44 is formed by the thick circular plates 43. The colors of the thick circular plates 43 forming the structure 44 configure the identification information 6.

In this manner, the change of the stacked condition can simply form a variety of the identification information 6. The prism is omitted in FIG. 21.

16. The prism-holding device 2 of the tenth embodiment shown in FIG. 22 possesses the increased identifying ability of the identification information 6. The identification information 6 of this prism-holding device 2 is formed by continuing the black and white belt-shaped colored sections in the axial direction of the pole 5, and a reflection member 46 (shown with a circle in FIG. 22) is disposed at the reverse end with respect to the prism 4 of the identification information 6.

In this manner, the identification information 6 is regarded in a range between the prism 4 and the reflection member 46 so that the identification information 6 can be promptly detected after the detection of the prism 4, and the false detection can be avoided.

17. The present invention includes the following embodiments in addition to the embodiments described above.

(1) The identification information 6 is configured by contrasting and blinking of an organic electro-luminescence (EL), a fluorescent sheet and a light-emitting diode (LED). In this manner, the prism 4 can be used even at the night time so that the identification information 6 may be also identified at dark.

(2) The camera elements 19, 33 mounted on the total station 3 is replaced with an infrared camera element. In this manner, the identification at dark can be effected where the identification information 6 cannot be discriminated in a visual range.

(3) The identification information 6 is formed as an equal-interval pattern, and a distance to the identification information 6 is estimated by one-dimensional frequency analysis. This embodiment is effective when a distance value cannot be obtained due to blocking of the prism 4 or is estimated by camera imaging information.

(4) In a one-element prism, an identifier added with the identification information 6 is placed on the same surface side of the function surface of the prism 4.

(5) Although the combination of black and white has been described for the coloring used in the identification information 6, the combination of other colors may be possible as long as the contrast difference is generated.

(6) The measurement system of the present invention is basically modified to below.

A measurement system including a reflection target having specific identification information, and a survey machine which, for conducting distance measurement based on reflected distance-measuring rays which are output to the reflection target and reflected from the reflection target, can include the setup identification information, and can check the specific identification information with the setup identification information.

In this manner, whether or not the checked reflection target is the desired reflection target can be judged by setting up the specific identification information possessed by the desired reflection target so that the desired reflection target can be simply identified.

(7) The measurement method of the present invention is basically modified to below.

A measurement method in which a distance is measured based on reflected distance-measuring rays which are output to a reflection target and reflected from the reflection target, the method including the configuration of using the reflection target including specific identification information, and of checking the specific identification information possessed by the reflection target with the identification information of the desired reflection target for the distance measurement.

In this manner, by setting up the specific identification information possessed by the desired reflection target as the setup identification information, whether or not the checked reflection target is the desired reflection target can be judged.

Accordingly, by using the above method, the desired reflection target can be simply identified similar to the effects of the above item (6).

(7-1) The measurement method of the present invention is basically modified to below under the configuration of the item (6).

Before the checking between the specific identification information of the reflection target and the specific identification information of the desired reflection target, the first searching for searching the reflection target is at first performed, then the second searching for searching the specific identification information of the reflection target near the reflection target is performed when the reflection target is detected in the first searching, and the specific identification information of the reflection target is detected from the searched information of the second searching, and further after obtaining the image information of the side where the reflection target exists, the first searching is performed to estimate the existence estimation region of the reflection target based on the image information for detecting the reflection target.

In this case, the reflection target is detected according to the setup preference order.

In this manner, the proper detection processing can be performed based on the setup preference order.

(8) The survey machine of the present invention is basically modified to below.

A survey machine for conducting the distance measurement based on the reflected distance-measuring rays which are output to the reflection target storing specific identification information and reflected from the reflection target, the survey machine including:

the operation inputting unit for setting up the identification information;

an identification information incorporating unit for incorporating the specific identification information of the reflection target; and the checking unit of checking the identification information incorporated by the identification information incorporating unit with the setup identification information input by the operation inputting unit.

In this manner, whether or not the checked reflection target is the desired reflection target can be judged by setting up the specific identification information possessed by the desired reflection target so that the desired reflection target can be simply identified similarly to the configuration of the above item (6).

(8-1) The measurement method of the present invention is basically modified to below under the configuration of the item (8).

The identification information incorporating unit includes the first searching unit for searching the reflection target, the second searching unit for searching the identification information possessed by the reflection target near the reflection target when the first searching unit detects the reflection target, and the identification information unit for detecting the identification information of the reflection target by the searched information from the second searching unit, and further the first searching unit includes the camera element for obtaining the image information, the existence estimation region judging unit of the reflection target based on the image information obtained by the camera element, and the reflection target-detecting unit for detecting the reflection target in the existence estimation region.

In this case, the first searching init includes the processing-order determining unit for determining the processing-order in the detection of the reflection target in the existence estimation region of the reflection target.

In this manner, the effects similar to those of the item (7-1) can be obtained.

(9-1) The specific identification information under the configuration defined in the above claim 9 (reflection target for measurement) includes the contrast difference pattern.

In this manner, each of the plurality of the identification information can be identified from each other by differentiating the contrast difference pattern.

(9-2) The contrast difference pattern under the configuration defined in the above item (9-1) is mounted on one end of the stretchable supporting member, a plurality of the band-shaped colored sections are arranged on the external peripheral surface of one end of the supporting member and are sequentially added on the entire circumference in the axial direction or the width direction of the supporting member, and the contrast difference pattern is configured by the plurality of the band-shaped colored sections.

In this manner, the specific embodiment of the contrast difference pattern (identification information) which may be identified from each other can be provided.

In this case, the pattern of the identification information can be made the same when the pattern is viewed from the entire direction to increase the degree of freedom of use because the reflection target reflects the input rays from the all circumference.

(9-3) The specific identification information under the configuration defined in the above claim 9 (reflection target of measurement) is configured as a single shape pattern.

In this manner, the formation of the fine pattern is no longer required, and the shape pattern can be identified even if the identification information is more or less lost on the image due to the external disturbance. Further, the pattern is single so that the larger size of pattern can be provided. Accordingly, the identification is possible even when the distance to the reflection target is large.

(9-4) The specific identification information under the configuration defined in the above claim 9 (reflection target of measurement) is configured as a colored pattern formed by a plurality of color-displaying groups.

In this manner, each of the plurality of the identification information can be identified from each other by differentiating the colors of the plurality of the color-displaying groups.

(9-5) The colored pattern under the configuration defined in the above item (9-4) is configured to include a plurality of standard color-displaying groups.

In this manner, even if the color tones of the standard color-displaying groups and the color-displaying groups are changed due to the outside light and the darkness, these groups are changed in accordance with the same conditions so that the color pattern situation made by the colored sections among the plurality of the color-displaying groups can be comprehended by selecting the same colors with the respective colored sections of the standard color-displaying groups from the respective colored sections of the color-displaying groups. Accordingly, even if the color tones of the respective colored sections are changed due to the outside light and the darkness, the reduction of the identifying ability of the identification information can be suppressed.

(9-6) The plurality of the color-displaying groups under the configuration defined in the above item (9-4) is configured by the belt-shaped colored sections on the external surface of the telescopic structure, wherein plurality of the color-displaying groups are mounted on one end of the stretchable supporting member, the telescopic structure is removably mounted on one end of the supporting member to cover one end of the supporting member, and the plurality of the belt-shaped colored sections are arranged on the external peripheral surface of the telescopic structure and are sequentially added on the entire circumference in the axial direction or the width direction of the telescopic structure.

In this manner, the identification information can be formed by simply mounting the telescopic structure on the supporting member so that the supporting member can be made compact by the shortening thereof when the supporting member is not used after the removal of the telescopic structure. By using this telescopic structure, a variety of identification information can be formed by adjusting the telescopic condition of the telescopic structure (9-7) The plurality of the color-displaying groups under the configuration defined in the above item (9-4) is configured by the colors of the plurality of the thick circular plates, wherein the plurality of the color-displaying groups are mounted on one end of the stretchable supporting member, and the plurality of the thick circular plates having the added colors are removably mounted on the external surface of the supporting member in a stacked condition.

In this manner, a variety of identification information can be simply formed by adjusting the stacked condition of the thick circular plates.

(9-8) The color pattern formed by the plurality of the color-displaying groups is formed as the specific identification information under the configuration defined in the above item (9-2) or (9-3), and one of the configurations from the items (9-5) to (9-7) is applied to the color pattern.

DESCRIPTION OF SYMBOLS 1 measurement system
2 prism-holding device
3 total station (survey machine)
4 prism (reflection target)
5 pole (supporting member)
6 identification information
6A identifier
16 operation inputting section (operation inputting unit)
19 narrow-angle camera element (second searching unit, camera-under-use element)
28. emitting section for distance-measuring (second searching unit, unit of distance-measuring)
33 wide-angle camera element (first searching unit, second searching unit, camera element, camera-under-use element)
34 light-receiving element (first searching unit)
U control unit (first searching unit, second searching unit, unit of judging estimation region of existence of reflection target, processing-order determining unit, reflection target detecting unit, distance-measuring unit, camera-under use element judging unit, identification information detecting unit, checking unit)

The invention claimed is:

1. A measurement system comprising:
a plurality of reflection targets, each of which is supported by a supporting member including specific identification information by which the reflection target can be identified from other reflection targets; and
a survey machine, for conducting a distance measurement based on reflected distance-measuring rays which are outputted to the reflection target and reflected from the reflection target, including
an operation inputting unit for setting up the identification information,
a first searching unit for searching the reflection target,
a second searching unit for searching the specific identification information near the reflection target when the first searching unit detects the reflection target,
an identification information detecting unit for detecting the specific identification information from the searched information of the second searching unit, and
a checking unit checking the identification information detected by the identification information detecting unit with setup identification information set up by the operation inputting unit,
wherein the identification information includes a color arrangement pattern with a certain width, and the pattern is continuously arranged in the axial direction of the supporting member on the whole circumference of the supporting member, the color arrangement patterns being different for different reflection targets, and
wherein the operation inputting unit first computes the distance to the reflection target on the basis of information provided by the first searching unit, and directs the second searching unit to search for the specific identification information by searching a distance below the reflection target, the distance below being computed on the basis of the distance to the reflection target.

2. The measurement system as defined in claim 1,
wherein, after obtaining image information, the first searching unit is set up to estimate an existence estimation region where the reflection target exists based on the image information, and to detect the reflection target in the existence estimation region, and
wherein when the checking unit judges that identification information detected by the identification information detecting unit does not coincide with the setup identification information, a new reflection target is searched.

3. The measurement system as defined in claim 1, wherein the supporting member includes a pole having an individual color coding applied to it.

4. The measurement system as defined in claim 3, wherein the pole is attached to a stationary surface.

5. A measurement method in which distances are measured based on reflected distance-measuring rays which are outputted to different reflection targets and reflected back from the reflection targets,
the method comprising:
using reflection targets, each of which is supported by a supporting member that includes specific identification information by which the reflection target can be identified from other reflection targets;
performing a first searching for finding one of the reflection targets before the distance measurement,
computing the distance to the reflection target after finding the reflection target,
computing a distance below the reflection target where the specific identification information on the member supporting the reflection target is likely to be based on the computed distance to the reflection target,
performing a second searching for finding the specific identification information near the reflection target after the reflection target is detected in the first searching based on the computed distance below the reflection target;

detecting the specific identification information from the searched information of the second searching; and checking the specific identification information with specific identification information of a desired reflection target, wherein the identification information includes a color arrangement pattern with a certain width, and the pattern is continuously arranged in the axial direction of the supporting member on the whole circumference of the supporting member, the color arrangement patterns being different for different reflection targets.

6. The measurement method as defined in claim 5, wherein, after obtaining image information, the first searching is set up to estimate an existence estimation region where the reflection target exists based on the image information, and to detect the reflection target in the existence estimation region, and when a result of the checking is that the specific identification information does not coincide with the identification information of the desired reflection target, a new reflection target is searched under the first searching.

7. The measurement method as defined in claim 5, wherein the second searching is set up to measure a distance to the reflection target detected by the first searching for obtaining image information based on its measured distance value.

8. A survey machine for conducting distance measurement based on reflected distance-measuring rays which are outputted to different reflection targets, each of which is supported by a supporting member including specific identification information by which the reflection target can be identified from other reflection targets and reflected from the reflection target, the survey machine comprising:

an operation inputting unit for setting up the identification information;

a first searching unit for searching the reflection target;

a second searching unit for searching the specific identification information near the reflection target when the first searching unit detects the reflection target;

an identification information detecting unit for detecting the specific identification information from the searched information of the second searching unit; and a checking unit for checking the identification information detected by the identification information detecting unit with setup identification information set up by the operation inputting unit, wherein the identification information includes a color arrangement pattern with a certain width, and the pattern is continuously arranged in the axial direction of the supporting member on the whole circumference of the supporting member, the color arrangement patterns being different for different reflection targets, and wherein the operation inputting unit first computes the distance to the reflection target on the basis of information provided by the first searching unit, and directs the second searching unit to search for the specific identification information by searching a distance below the reflection target, the distance below being computed on the basis of the distance to the reflection target.

9. The survey machine as defined in claim 8, wherein the first searching unit includes a camera element for obtaining image information, a unit of judging estimation region of existence of reflection target, a reflection target detecting unit which detects the reflection target in the estimation region of the existence of the reflection target judged by the unit of judging the estimation region, and wherein when the checking unit judges that identification information detected by the identification information detecting unit does not coincide with the setup identification information, a new reflection target is searched.

10. The survey machine as defined in claim 8, wherein the second searching unit includes a plurality of camera-under-use elements having different wide angles of field, a distance-measuring unit of the reflection target detected by the first searching unit, and a camera-under-use element judging unit for selecting the camera-under-use elements based on information from the distance-measuring unit.

* * * * *